US011801567B2

(12) United States Patent
Wilcox et al.

(10) Patent No.: US 11,801,567 B2
(45) Date of Patent: Oct. 31, 2023

(54) COLLET ASSEMBLY FOR FASTENER FEEDING APPARATUS

(71) Applicants: CenterLine (Windsor) Limited, Windsor (CA); Arconic Inc., Pittsburgh, PA (US)

(72) Inventors: Robert Wilcox, McGregor, TX (US); Thomas Kingsbury, Waco, TX (US); Dan Peter Vanderzwet, Ontario (CA); Simon Maurice Britton, Ontario (CA); Donald J. Spinella, Greensberg, PA (US); Daniel Bergstrom, Natrona Heights, PA (US); Eric Jean Michaud, Ontario (CA); Larry Frank Koscielski, Ontario (CA); Gino Norman Iasella, Pittsburgh, PA (US)

(73) Assignee: HOWMET AEROSPACE INC., Pittsburgh, PA (US)

(*) Notice: Subject to any disclaimer, the term of this patent is extended or adjusted under 35 U.S.C. 154(b) by 124 days.

(21) Appl. No.: 16/789,466

(22) Filed: Feb. 13, 2020

(65) Prior Publication Data

US 2020/0180063 A1    Jun. 11, 2020

Related U.S. Application Data

(63) Continuation of application No. PCT/US2018/065340, filed on Dec. 13, 2018.
(Continued)

(51) Int. Cl.
*B23K 9/20* (2006.01)
*B23K 11/00* (2006.01)
(Continued)

(52) U.S. Cl.
CPC ............... *B23K 9/20* (2013.01); *B23K 9/28* (2013.01); *B23K 11/0053* (2013.01);
(Continued)

(58) Field of Classification Search
CPC ... B23K 9/20; B23K 9/24; B23K 9/28; B23K 9/282; B23K 11/0053; B23K 11/31
See application file for complete search history.

(56) References Cited

U.S. PATENT DOCUMENTS 3,352,996 A    11/1967  Neumeier et al.
4,267,425 A *   5/1981  Kondo ................. B23P 19/003
                                                219/98
(Continued)

FOREIGN PATENT DOCUMENTS

EP    1495828 A1    12/2005
EP    2314407 A1     4/2011
(Continued)

OTHER PUBLICATIONS

International Search Report and Written Opinion dated Apr. 2, 2019, issued by the Korean Intellectual Property Office in application No. PCT/US2018/065340 filed Dec. 13, 2018 (12 pages).

*Primary Examiner* — Justin C Dodson
(74) *Attorney, Agent, or Firm* — Greenberg Traurig, LLP

(57) ABSTRACT

A collet assembly including an actuator and a collet connected to the actuator. The collet assembly is adapted to be installed on a welding electrode holder having an electrode. The collet is moveable by the actuator from an advanced position, in which the collet is adapted to grip a fastener such as a welding rivet, and a retracted position, in which at least a portion of the collet is retracted into the actuator to enable the electrode to engage the fastener for welding to a work piece, and the collet is adapted to release the fastener.

21 Claims, 22 Drawing Sheets

Related U.S. Application Data

(60) Provisional application No. 62/598,715, filed on Dec. 14, 2017.

(51) Int. Cl.
  *B23K 9/28* (2006.01)
  *B23K 11/25* (2006.01)
  *B23K 11/30* (2006.01)
  *B23K 11/31* (2006.01)

(52) U.S. Cl.
  CPC .......... *B23K 11/0066* (2013.01); *B23K 11/25* (2013.01); *B23K 11/3009* (2013.01); *B23K 11/314* (2013.01)

(56) References Cited

U.S. PATENT DOCUMENTS

| | | | |
|---|---|---|---|
| 4,577,794 A | 3/1986 | Armstrong et al. | |
| 4,609,134 A | 9/1986 | Davern | |
| 4,789,768 A * | 12/1988 | Tobita | B23K 11/0053 219/95 |
| 5,688,414 A * | 11/1997 | Kondo | B23K 9/205 219/98 |
| 7,053,332 B2 * | 5/2006 | Schmitt | B23K 9/205 219/98 |
| 7,071,440 B2 | 7/2006 | Sakoda | |
| 7,262,383 B2 * | 8/2007 | Mauer | B23K 9/206 219/98 |
| 9,517,526 B2 | 12/2016 | Sakamoto | |
| 10,507,514 B2 | 12/2019 | Wilcox | |
| 2003/0217992 A1 | 11/2003 | Obermann | |
| 2004/0056005 A1 | 3/2004 | Willershausen | |
| 2004/0206727 A1 * | 10/2004 | Papke | B23K 9/205 219/98 |
| 2005/0023252 A1 * | 2/2005 | Sakoda | B23K 9/20 219/98 |
| 2007/0271764 A1 * | 11/2007 | Stevenson | B21J 15/043 29/709 |
| 2014/0007414 A1 | 1/2014 | Muth et al. | |
| 2014/0025196 A1 | 1/2014 | Hain et al. | |
| 2014/0079494 A1 | 3/2014 | Hain et al. | |
| 2015/0375332 A1 | 12/2015 | Dillon et al. | |
| 2016/0262214 A1 | 9/2016 | Kondo et al. | |

FOREIGN PATENT DOCUMENTS

| | | |
|---|---|---|
| JP | 10225774 A | 8/1998 |
| JP | 2007-185669 A | 7/2007 |
| KR | 20090087601 A | 8/2009 |
| KR | 10-2017-0057080 A | 5/2017 |
| WO | 2007074561 A1 | 5/2007 |

* cited by examiner

COLLET ASSEMBLY FOR FASTENER FEEDING APPARATUS

CROSS-REFERENCE TO RELATED APPLICATION

The present application is a continuation application relating to and claiming the benefit of commonly-owned, International Patent Application No. PCT/US2018/065340, filed Dec. 13, 2018, entitled "COLLET ASSEMBLY FOR FASTENER FEEDING APPARATUS", which relates to and claims the benefit of commonly-owned, U.S. Provisional Patent Application Ser. No. 62/598,715, filed Dec. 14, 2017, entitled "FASTENER FEEDING APPARATUS," the entirety each of which is incorporated by reference herein.

TECHNICAL FIELD OF THE INVENTION

The present invention relates to fastener feeding apparatus and, more particularly, to a collet assembly for a resistance welding fastener feeding apparatus.

BACKGROUND ART

Current methods of fastening work pieces such as sheets to one another include conventional spot welding, the use of self-piercing rivets, and the use of flow drill rivets. The latter two methods require feeding systems for the rivets. A system for feeding and installing fasteners into a recess or counter-bore of a work piece in multiple axes is desired.

DISCLOSURE OF THE INVENTION

In an embodiment, a collet assembly, comprising an actuator, and a collet connected to the actuator, the collet assembly being adapted to be installed on an external electrode holder, the collet being moveable by the actuator from an advanced position, in which the collet is adapted to grip a fastener, and a retracted position, in which at least a portion of the collet is retracted into the actuator to enable an electrode attached to the electrode holder to engage the fastener, and in which the collet is adapted to release the fastener. In an embodiment, the collet is adapted to release the fastener once the fastener is clamped by the electrode to an external workpiece.

In an embodiment, the collet includes an elongated shank portion and a plurality of collet fingers extending from the shank portion, the plurality of collet fingers being sized and shaped to grip the fastener when the collet is in its advanced position. In an embodiment, each of the plurality of collet fingers includes a gripping portion. In an embodiment, each of the gripping portions includes a tapered member that is tapered inwardly relative to a longitudinal axis of the collet. In an embodiment, each of the gripping portions includes a first gripping segment that extends from the tapered member outwardly relative to the longitudinal axis of the collet, and a second gripping segment that extends from the first gripping segment inwardly relative to the longitudinal axis of the collet. In an embodiment, the collet includes a ring positioned around the plurality of collet fingers.

In an embodiment, the actuator includes a housing having an upper end, a lower end opposite the upper end, and a central passage extending from the upper end to the lower end, and wherein the collet is positioned slidably within the central passage of the housing of the actuator. In an embodiment, the actuator includes a sleeve member having an inner sleeve positioned within the central passage of the housing of the actuator, and wherein the collet includes an internal passage, and wherein the inner sleeve of the sleeve member of the actuator is positioned within the internal passage of the collet. In an embodiment, the sleeve member includes a cap attached to the upper end of the housing. In an embodiment, the cap is attached removably to the upper end of the housing. In an embodiment, the sleeve member is integral with the housing. In an embodiment, the cap includes an advance port in communication with the central passage of the housing for providing pneumatic air pressure for advancing the collet to its advanced position. In an embodiment, the cap includes a return port in communication with the central passage of the housing for providing pneumatic air pressure for retracting the collet to its retracted position. In an embodiment, the collet includes a sensor member, and wherein the actuator includes a sensor located proximate to the upper end of the housing for sensing an alignment of the sensor member of the collet with the sensor when the collet is in its retracted position.

In an embodiment, the electrode holder is positioned within the inner sleeve of the sleeve member. In an embodiment, the electrode holder includes an adapter shaft, the electrode being attached removably to the adapter shaft, wherein the electrode cap is shrouded by the collet when the collet is in its advanced position, and the electrode cap is exposed from the collet when the collet is in its retracted position. In an embodiment, the electrode is a welding electrode. In an embodiment, the fastener is a rivet. In another embodiment, the fastener is a stud. In an embodiment, the inner sleeve includes a free end having a beveled surface and positioned within the central passage of the housing proximate to the lower end of the housing, and wherein when the collet is moved from its advanced position to its retracted position, the tapered members of the collet engage the beveled surface of the inner sleeve. In an embodiment, the advance port and the return port are further adapted to release the pneumatic air pressure to enable the collet to move freely within the actuator relative to the inner sleeve between the advanced position of the collet and the retracted position of the collet.

In an embodiment, in combination, a welding gun having a welding electrode, and a collet assembly, comprising an actuator, and a collet connected to the actuator, the collet assembly being installed on the welding electrode, the collet being moveable by the actuator from an advanced position, in which the collet is adapted to grip a fastener, and a retracted position, in which at least a portion of the collet is retracted into the actuator to enable the electrode to weld the fastener to an external work piece, and in which the collet is adapted to release the fastener.

BRIEF DESCRIPTION OF THE DRAWINGS

FIG. 3A is close up view of an actuator and a collet employed by the feeding apparatus shown in FIGS. 1 and 2, the actuator and the collet shown in the first, home position, while

BEST MODE FOR CARRYING OUT THE INVENTION

Figure 1:
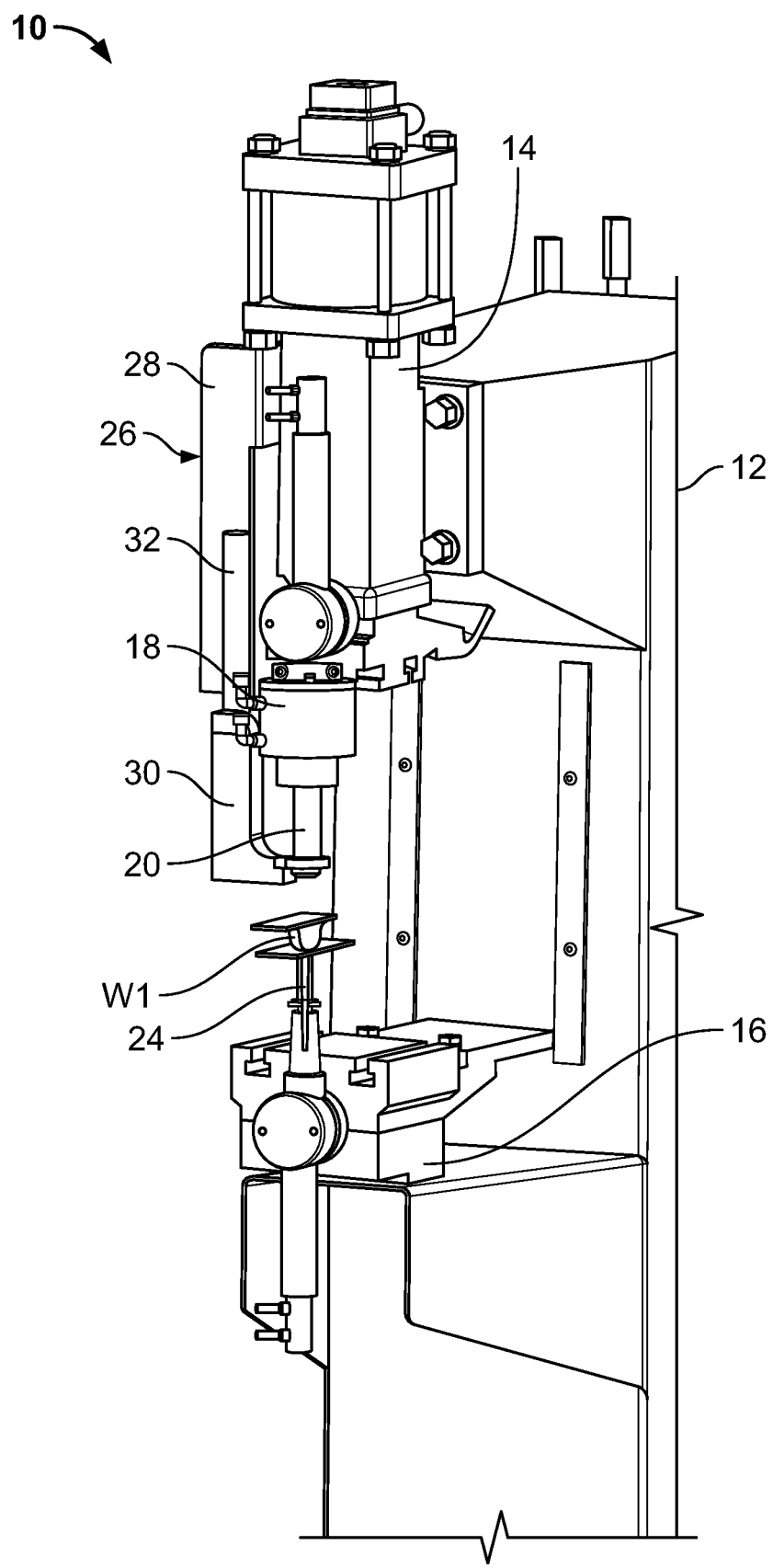
FIG. 1 is a front perspective view of a resistance welding fastener feeding apparatus in accordance with an embodiment.
Figure 2:
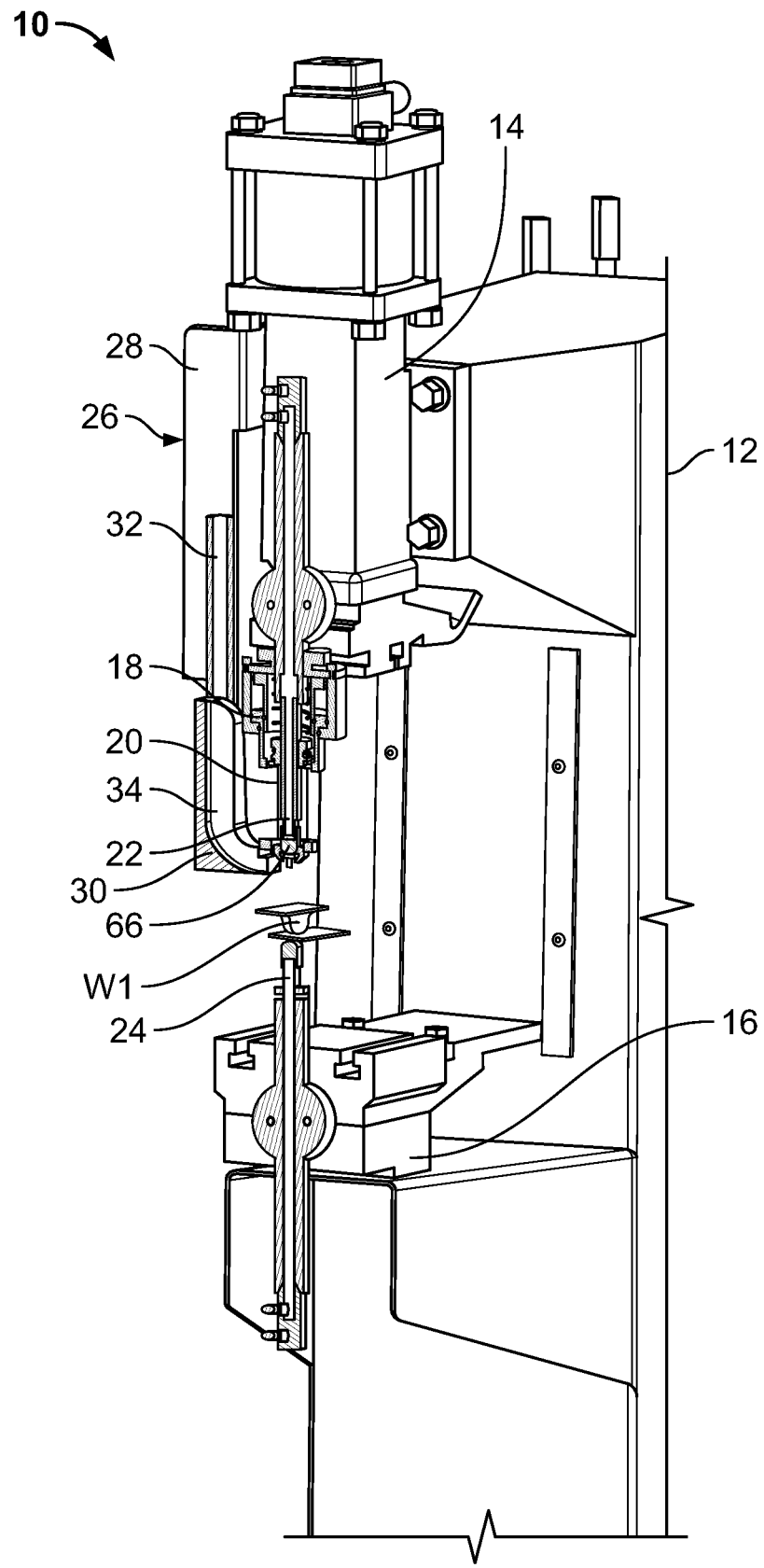
FIG. 2 is a front perspective review of the feeding apparatus shown in FIG. 1, but with certain components thereof shown in cross-section, the feeding apparatus shown in a first, home position.

FIGS. 1 and 2 show an embodiment of a resistance welding fastener feeding apparatus 10 (hereinafter, the "feeding apparatus 10"). In an embodiment, the feeding apparatus 10 is adapted to weld a fastener to a work piece W1, such as a sheet, panel, or other suitable structure. In an embodiment, the work piece W1 is a flat sheet. In an embodiment, the work piece W1 includes a recess. In an embodiment, the feeding apparatus 10 includes a welder housing 12, an upper welder portion 14 mounted to the welder housing 12, and a lower welder portion 16 mounted to the welder housing 12 and is positioned opposite the upper welder portion 14. In an embodiment, the upper welder portion 14 includes an actuator 18, a collet 20 mounted to and extending from the actuator 18, and an upper electrode 22 that is sized, shaped, and adapted to receive movably and slidably the collet 20. In an embodiment, the collet 20 surrounds the upper electrode 22 and is movable axially relative to the upper electrode 22. In an embodiment, the collet 20 is a split collet. In an embodiment, the collet 20 is oriented and extends from the actuator 18 vertically or substantially vertically and downwardly, as shown in FIGS. 1 and 2. In an embodiment, the lower welder portion 16 includes a lower electrode 24. In an embodiment, the lower electrode 24 extends upwardly and vertically or substantially vertically. In an embodiment, the lower electrode 24 is aligned axially with the upper electrode 22. In other embodiments, the feeding apparatus 10 can be constructed such that the collet 20, the upper electrode 22, and the lower electrode 24 extend in other directions, orientations, and positions, it being understood that the upper electrode 22 and the lower electrode 24 be aligned with one another.

Still referring to FIGS. 1 and 2, in an embodiment, the feeding apparatus 10 includes a fastener delivery system 26 having an upper feeding portion 14 and a lower, fixed point delivery portion 30, one end of which is mounted to the upper feeding portion 28 and an opposite end of which is connected to the collet 20, as will be discussed in further detail hereinafter. In an embodiment, the upper feeding portion 28 is substantially elongated, while the lower, fixed point delivery portion 30 is generally L-shaped. In an embodiment, the upper feeding portion 28 includes an inner feed tube 32, while the lower, fixed point delivery portion 30 includes an inner track 34 that is in communication with the feed tube 32 of the upper feeding portion 28. In an embodiment, the fastener delivery system 26 is adapted to receive and feed a single or a plurality of fasteners from the upper feeding portion 28 to the lower, fixed point delivery portion 30 and into the collet 20. In an embodiment, the inner feed tube 32 and the inner track 34 are sized and shaped to receive and transport the fasteners to the collet 20. In an embodiment, the fasteners are rivets. In an embodiment, the rivets are resistance welding rivets. In an embodiment, the fastener delivery system 26 feeds a single fastener to the collet 20 during one cycle of the fastening/welding process. In other embodiments, the fastener delivery system 26 feeds a plurality of fasteners for staging at the system for faster cycle times. In another embodiment, the feeding apparatus 10 utilizes a vibratory bowl or other appropriate feeding device to send the fasteners through the lower, fixed point delivery portion 30. In another embodiment, the feeding apparatus 10 may utilize a cartridge of fasteners mounted on the fixed-point delivery portion 30 for feeding the fasteners through. In another embodiment, the fasteners can be fed manually or hand loaded into the collet 20. In other embodiments, the fastener delivery system 26 can be positioned on either a fixed or moving electrode of the welder.

Figure 3A:
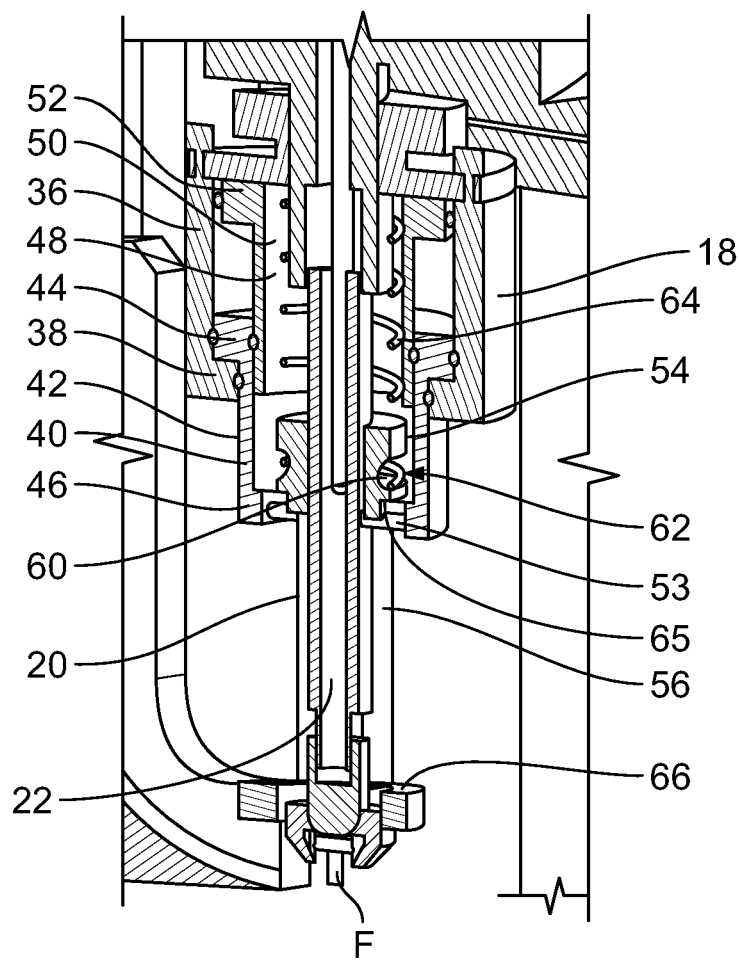

Referring to FIG. 3A, in an embodiment, the actuator 18 includes a tubular-shaped housing 36 having an upper end and a lower end, and an interior ledge 38 located proximate to the lower end. In an embodiment, a first tubular member 40 is located within the housing 36 and includes an elongated shank portion 42 and a flange 44 at an upper end thereof, the flange 44 juxtaposed with an engaging the ledge 38 of the housing 36 and is mounted to the housing 36 at the lower end thereof. In an embodiment, a portion of the elongated shank portion 42 of the first tubular member 40 extends from the lower end of the housing 36. In an embodiment, elongated shank portion 42 of the first tubular member 40 includes an interior, annular ledge 46 located at a lower end thereof. In an embodiment, a second tubular member 48 is positioned within the housing 36 and includes an elongated shank portion 50 and a flange 52 at one end thereof. In an embodiment, a portion of the elongated shank portion 50 of the second tubular member 48 is positioned within the elongated shank portion 42 of the first tubular member 40, and the flange 52 of the second tubular member 48 is mounted to the housing 36 proximate to the upper end thereof. In an embodiment, the actuator 18 includes a pin 53 that extends through the lower end of the elongated shank portion 42 of the first tubular member 40 transversely, as well as through the collet 20 which will be described hereinafter.

Figure 3B:
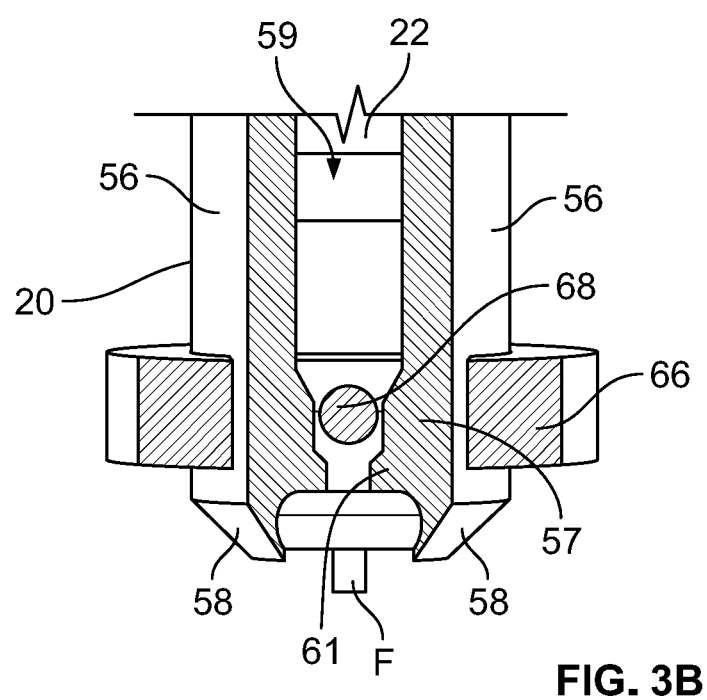
FIG. 3B is a front elevational, cross-sectional view of a portion of the collet shown in the first, home position.

Referring to FIGS. 3A and 3B, in an embodiment, the collet 20 includes a base 54 at one end thereof and a plurality of collet fingers 56 extending from the base 54, each of which includes a tapered, gripping portion 58 at a lower end thereof. In an embodiment, each of the gripping portions 58 of the collet fingers 56 of the collet 20 includes an internal bump 57 (see also, FIG. 11). In an embodiment, the internal bumps 57 are rounded. In an embodiment, an elongated slot 59 is formed axially between the plurality of collet fingers 56, and the slot 59 includes a tapered end 61 located proximate to the lower end of the collet fingers 56. In an embodiment, the base 54 includes an annular groove 60 that is sized and shaped to receive a first spring 62, and a transverse slot 65 that is sized and shaped to receive therethrough the pin 53 of the actuator 18. In an embodiment, the first spring 62 secures the plurality of collet fingers 56 together as the collet 20 opens and closes. In an embodiment, the ledge 46 of the base 54 of the collet 20 does not contact the first tubular member 40, the slot 59 stops on the pin 53, and the pin 53 of the actuator 18 limits the travel of the collet 20, as will described hereinafter. In an embodiment, the upper electrode 22 extends through the actuator 18, and in particular, the first and second tubular members 40, 48, and through the collet 20. In an embodiment, a second spring 64 is positioned within the first and second tubular members 40, 48 of the actuator 18 and around the upper electrode 22. In an embodiment, one end of the second spring 64 engages a top portion of the base 54 of the collet 20. In an embodiment, the second spring 64 exerts a spring force against the collet 20 to facilitate the travel of the collet 20, which will be described in further detail hereinafter.

Referring to FIGS. 1 through 3B, the fixed-point delivery portion 30 of the fastener delivery system 26 includes a ring 66 is attached to and extends from the lower end of the lower, fixed point delivery portion 30. In an embodiment, the ring 66 is sized and shaped to receive axially the plurality of collet fingers 56 of the collet 20 therethrough. In an embodiment, the ring 66 includes a pin 68 that extends transversely through the slot 59 of the collet 20. In an embodiment, the pin 68 of the ring 66 is moveable within the slot 59 of the collet, which shall be described hereinafter.

Referring to FIGS. 1 through 3A, in an embodiment, the feeding apparatus 10 begins the cycle in its home position. A fastener F is feed through the fastener delivery system 26 to the fixed-point delivery portion 30. When the feeding apparatus 10 is in its home position, the second spring 64 biases the collet 20 axially in a direction towards the work piece W1. A top end of the slot 59 of the collet 20 contacts the pin 53 of the actuator 18, and, as such, controls the position of the collet 20 relative to the upper electrode 22. When the tapered end 61 of the slot 59 of the collet 20 contacts the pin 68 of the ring 66, the collet fingers 56 the collet 20 are forced open and spread apart from one another, thereby enabling the fastener F to enter the collet 20 and, more particularly, in between the gripping portions 58 of the collet fingers 56. In an embodiment, the opening in the collet 20 can be controlled so that a detent is created as the fastener F passes into the collet 20, thereby providing positive positioning of the fastener F. The first spring 62 of the collet 20 maintains the collet fingers 56 of the collet 20 together and is expandable in order to enable the collet fingers 56 to separate and spread apart from one another and hinge in order to open when required, such as when receiving the fastener F. In this regard, the fastener F is sent via the feed tube 32 of the fastener delivery system 26 and passes through the fixed-point portion delivery portion 30 of the fastener delivery system 26 into the collet 20.

Figure 4:
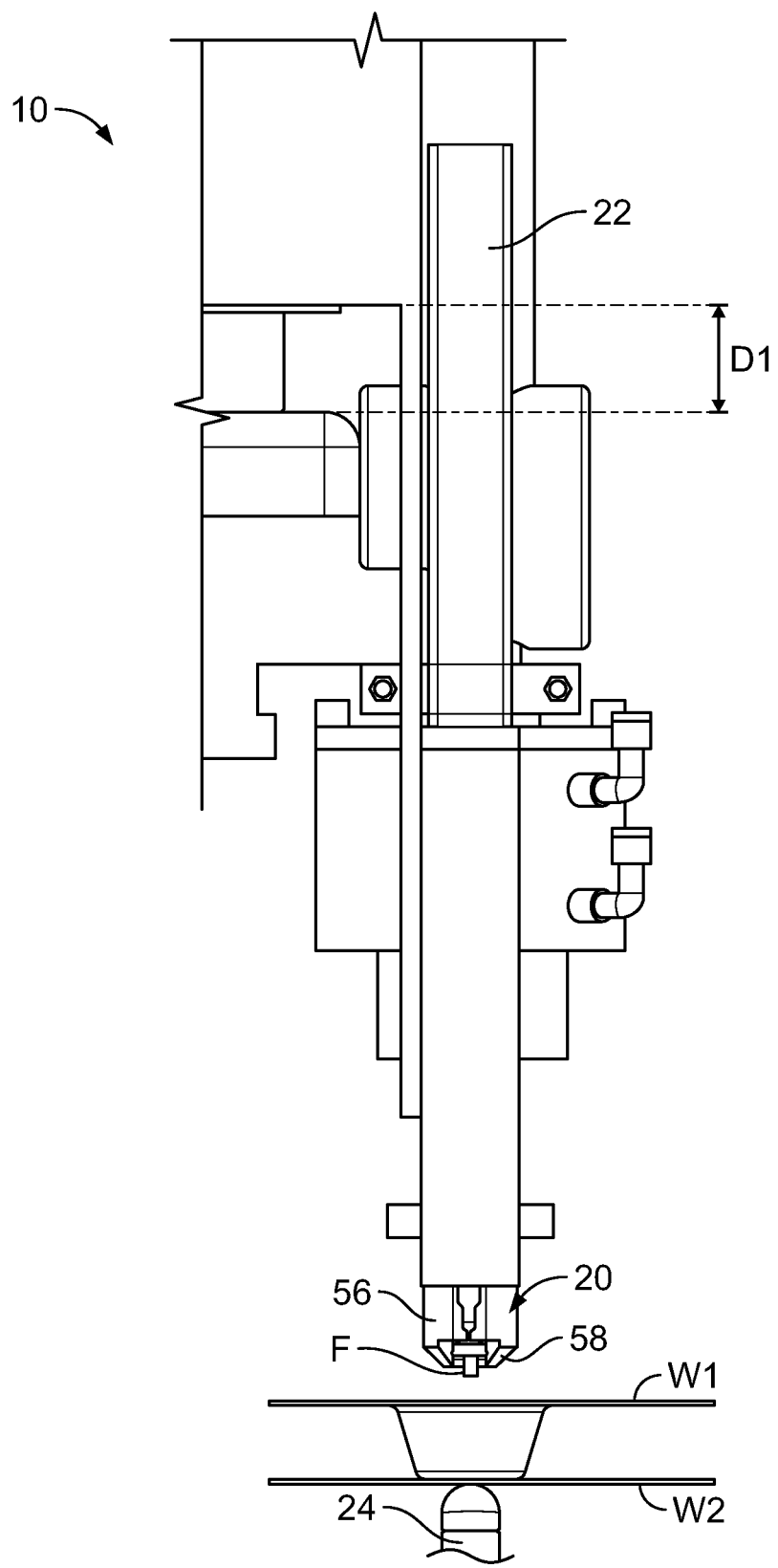
FIG. 4 is a front elevational, cross-sectional view of a portion of the feeding apparatus of FIGS. 1 and 2, the feeding apparatus shown in a second position such that an upper electrode employed by the feeding apparatus is moved towards a work piece.
Figure 5:
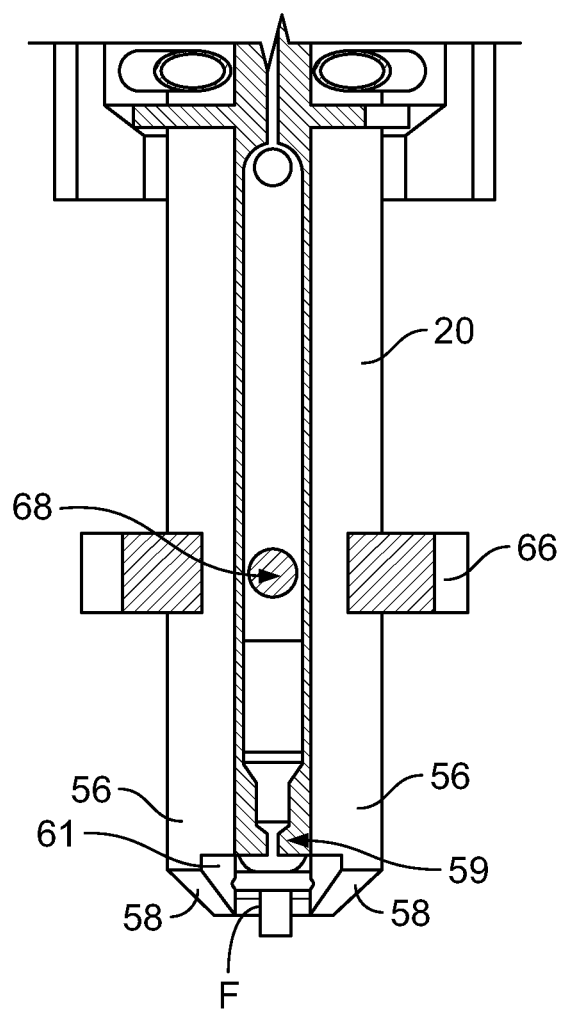
FIGS. 5 and 6 are front elevational, cross sectional views of the collet of the feeding apparatus shown in FIG. 4, the collet shown in the second position.
Figure 6:
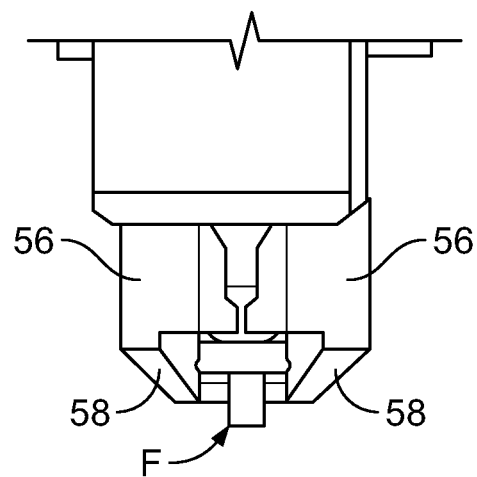

Referring to FIGS. 4 through 6, in an embodiment, the upper electrode 22 moves axially towards work pieces W1, W2 for a distance D1. As the upper electrode 22 moves toward the work pieces W1, W2, the tapered end 61 of the slot 59 of the collet 20 moves away from the pin 68 of the ring 68 of the fastener delivery system 26. In turn, the collet fingers 56 of the collet 20 close and the gripping portions 58 thereof firmly grip the fastener F, and keeps the fastener F aligned with the upper and lower electrodes 22, 24.

Figure 7:
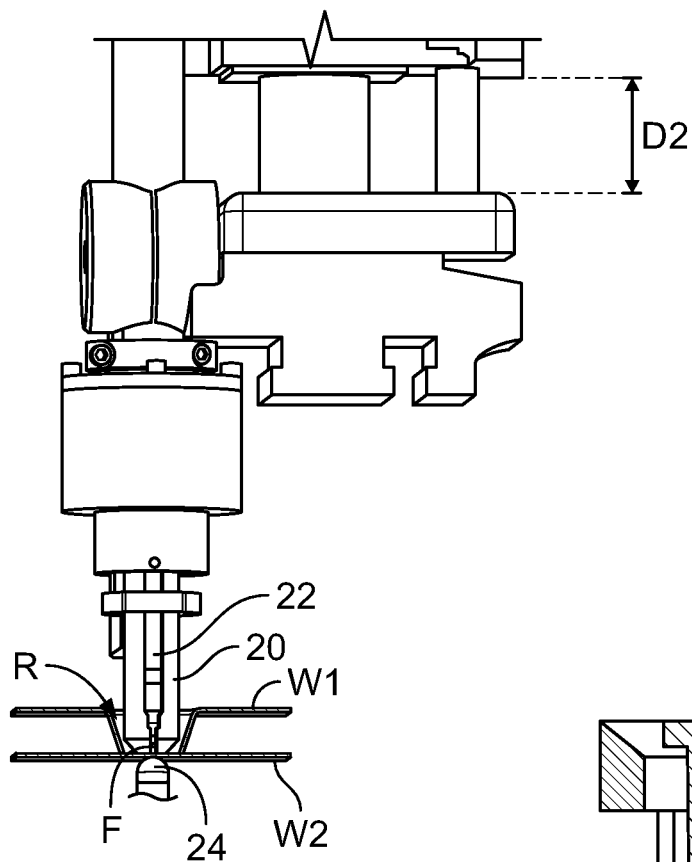
FIG. 7 is a front elevational, cross-sectional view of a portion of the feeding apparatus of FIGS. 1 and 2, the feeding apparatus shown in a third position such that a fastener is clamped between the upper electrode and the work piece.
Figure 8:
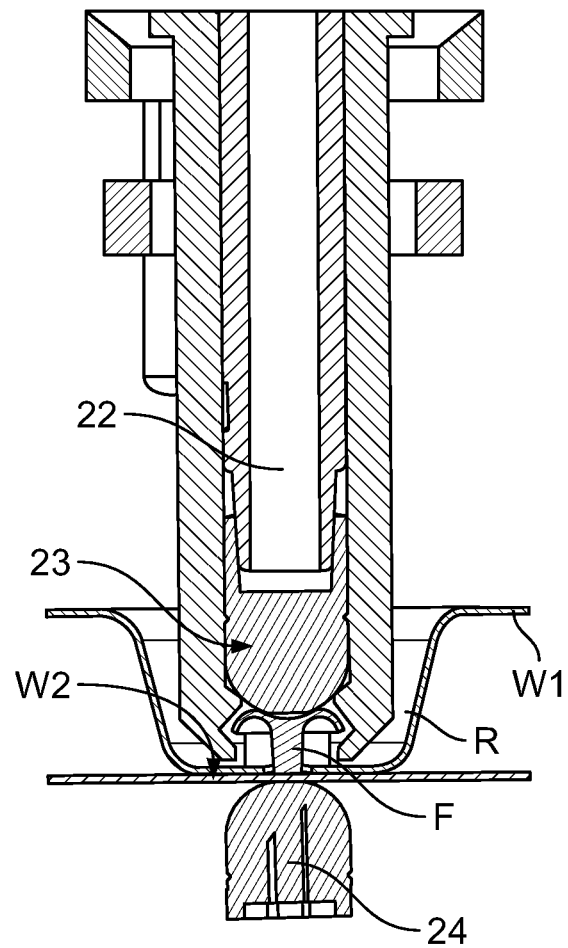
FIG. 8 is a front elevational, cross sectional view of the collet of the feeding apparatus shown in FIG. 7, the collet shown in the third position.

Referring to FIGS. 7 and 8, the upper electrode 22 further travels a distance D2 towards the sheet line of the work piece W1 until the fastener F is trapped between the work piece W1 and the upper electrode 22. If the collet 20 contacts the work piece W1 first, it is pushed back and moved out of the way of the upper electrode 22. This feature allows for the installation of relatively short fasteners. The general design of the feeding apparatus 10 allows for the installation of fasteners within the recess R of the work piece W1, especially when there is no side access to the fastener F due to the walls of the recess R creating an impediment.

Figure 9:
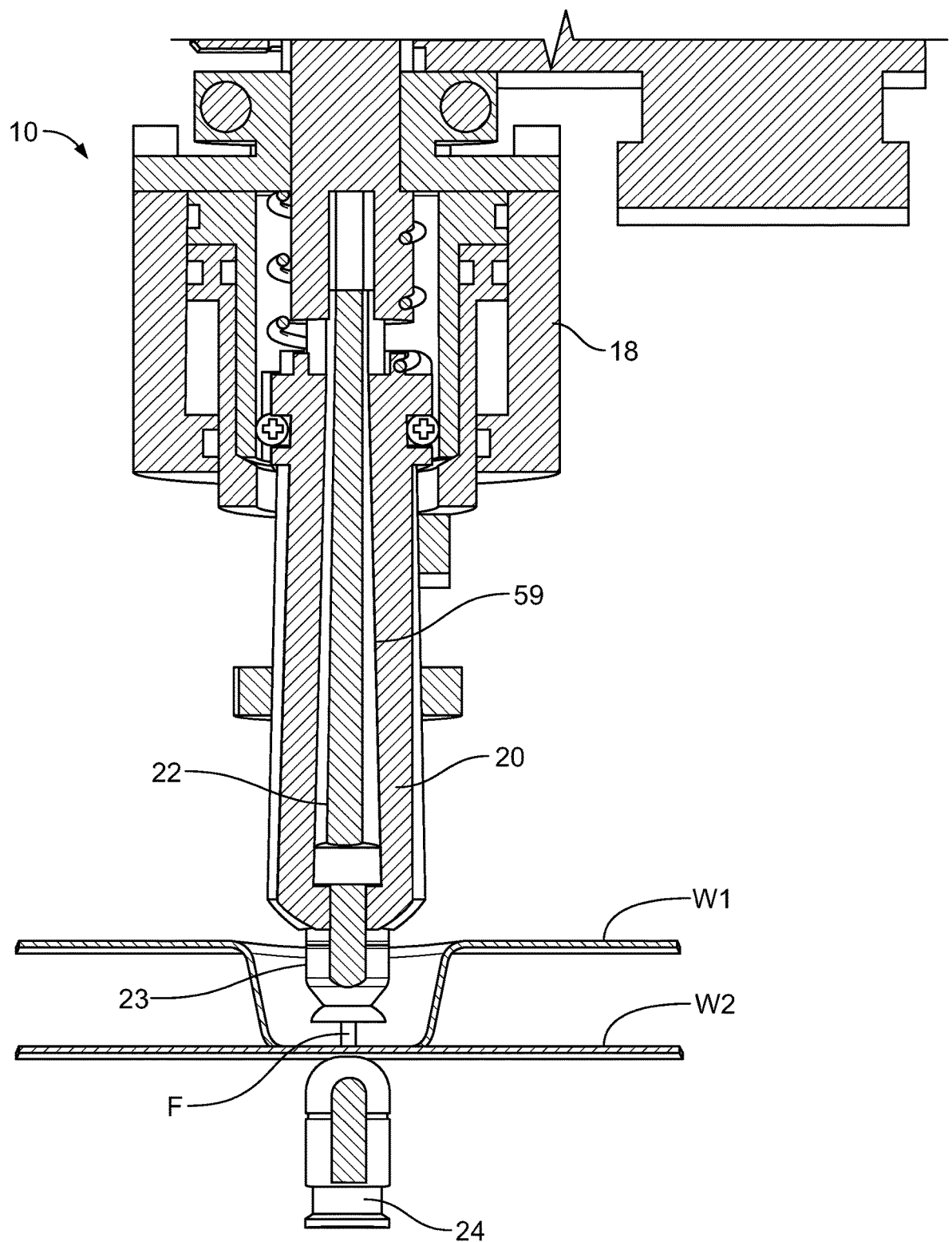
FIG. 9 is a front elevational, cross-sectional view of a portion of the feeding apparatus of FIGS. 1 and 2, the feeding apparatus shown in a fourth position such that the collet is retracted from the fastener.
Figure 10:
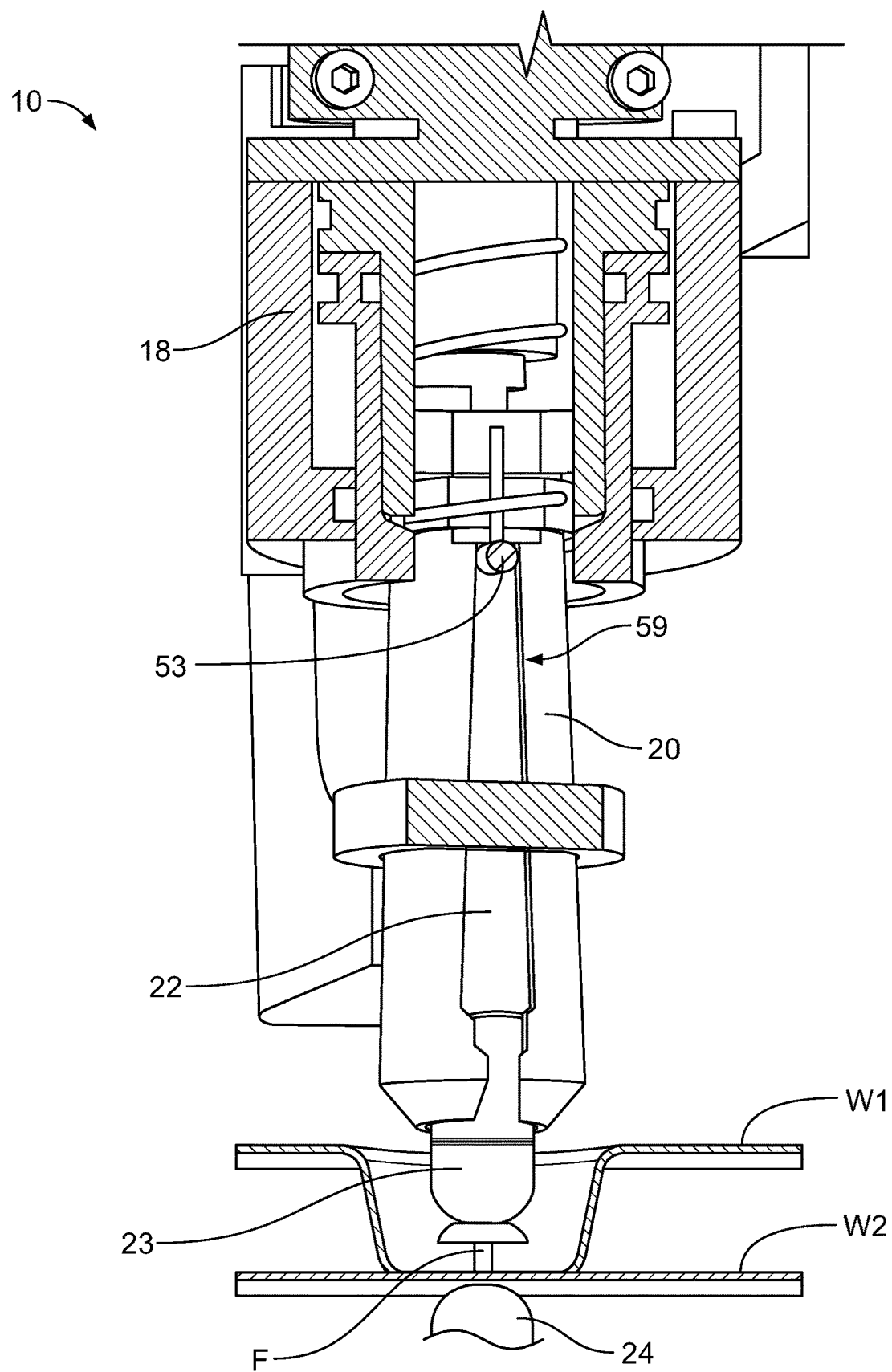
FIGS. 10 and 11 are front elevational, cross sectional close-up views of the collet of the feeding apparatus shown in FIG. 9, the collet shown in the fourth position.
Figure 11:
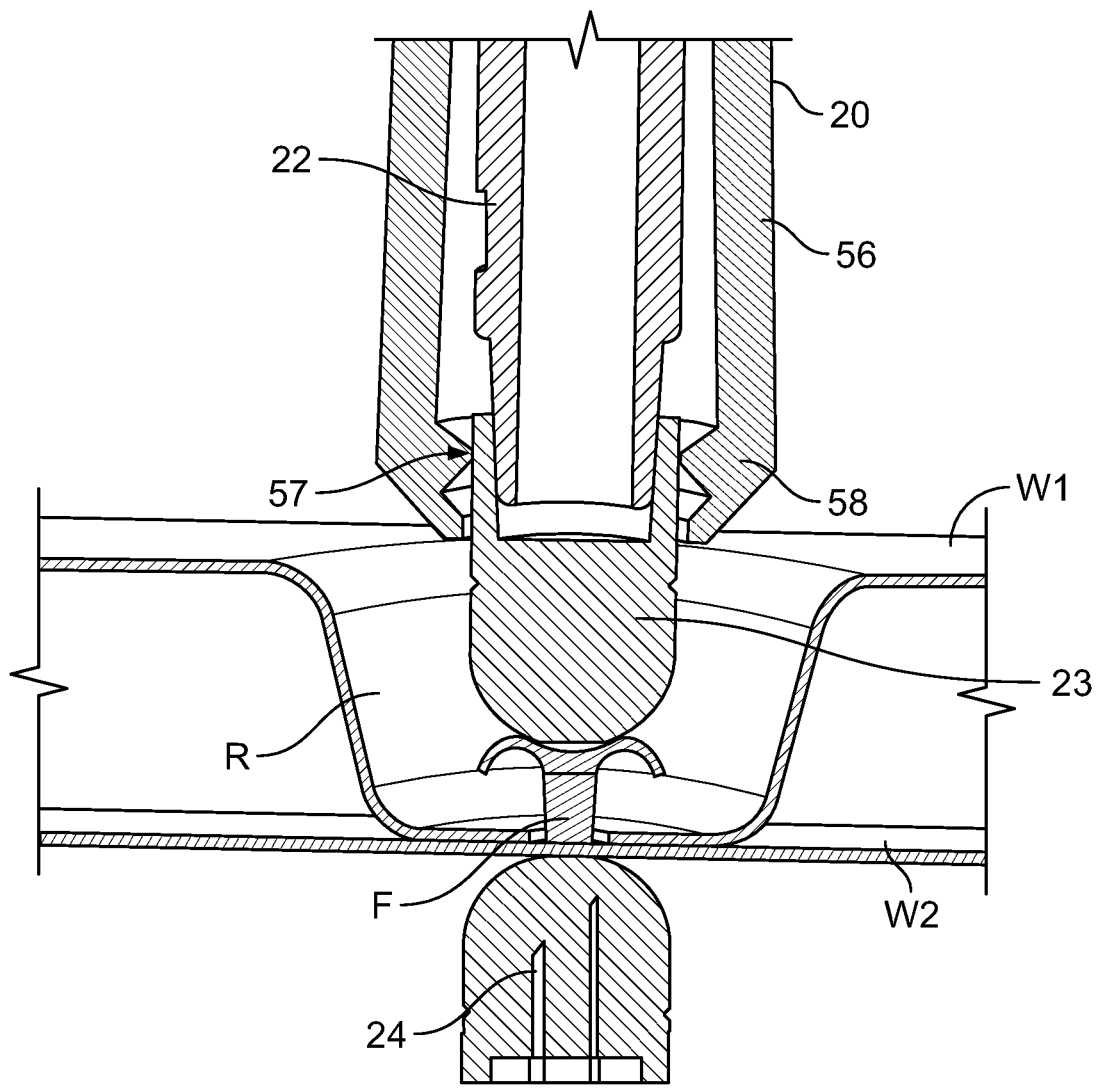

Referring to FIGS. 9 and 10, the actuator 18 is engaged and energized, and the collet 20 is retracted along the axis of the upper electrode 22 away from the work pieces W1, W2, thus exposing an electrode tip 23. In this regard, the pin 53 of the actuator 18 contacts the upper end of the slot 59 of the collet 20, pulling separating the collet fingers 56 and pulling the collet 20 back as the actuator 18 retracts. Retracting the collet 20 behind a "dress line" of the tip 23 of the upper electrode 22 enables the tip 23 to be dressed. The fastener F is then welded to the work pieces W1, W2 via the upper and lower electrodes 22, 24. Referring to FIG. 11, the rounded bumps 57 prevent excess wear on the upper electrode 22. In an embodiment, as the upper electrode 22 is worn and dressed, it is not necessary to adjust the gap to the fastener F. Capturing the fastener F is not dependent upon the position of the upper electrode 22 relative to the fastener F during the welding process.

After a cycle is complete, the upper electrode 22 retracts and the actuator 18 moves the collet 20 back over the tip 23 of the upper electrode 22 and the feeding apparatus 10 moves back to its first, home position. The collet 20 is again aligned with the fastener delivery system 26 and is opened again to allow the entry of the next fastener F.

FIGS. 12 through 28 show another embodiment of a resistance welding fastener feeding apparatus 110 (hereinafter, the "feeding apparatus 110"). Unless otherwise stated, the embodiments of FIGS. 12 through 28 are constructed and assembled in the same basic manner as the embodiment of FIGS. 1 through 11.

Figure 12:
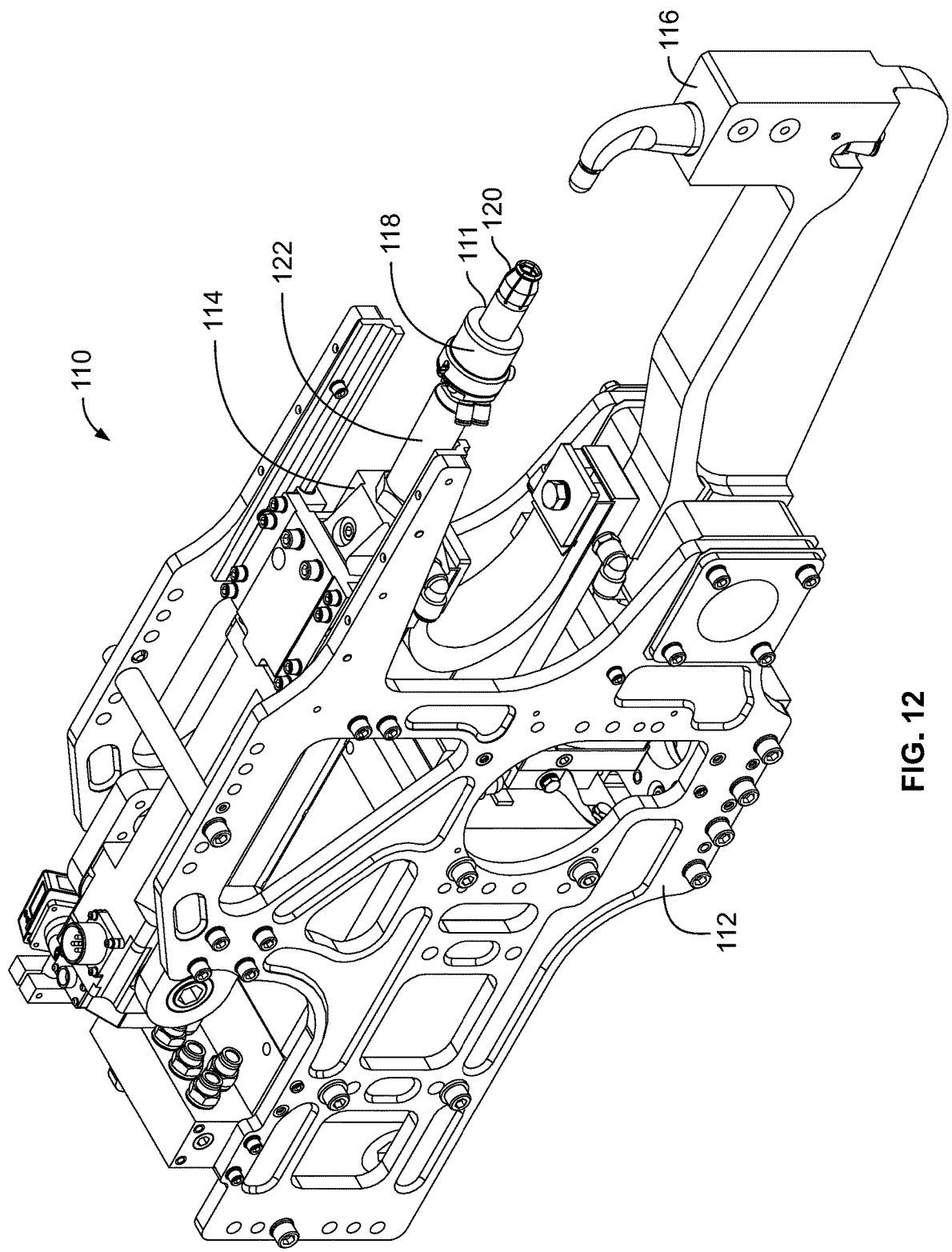
FIG. 12 is a perspective view of a resistance welding fastener feeding apparatus in accordance with another embodiment.
Figure 13:
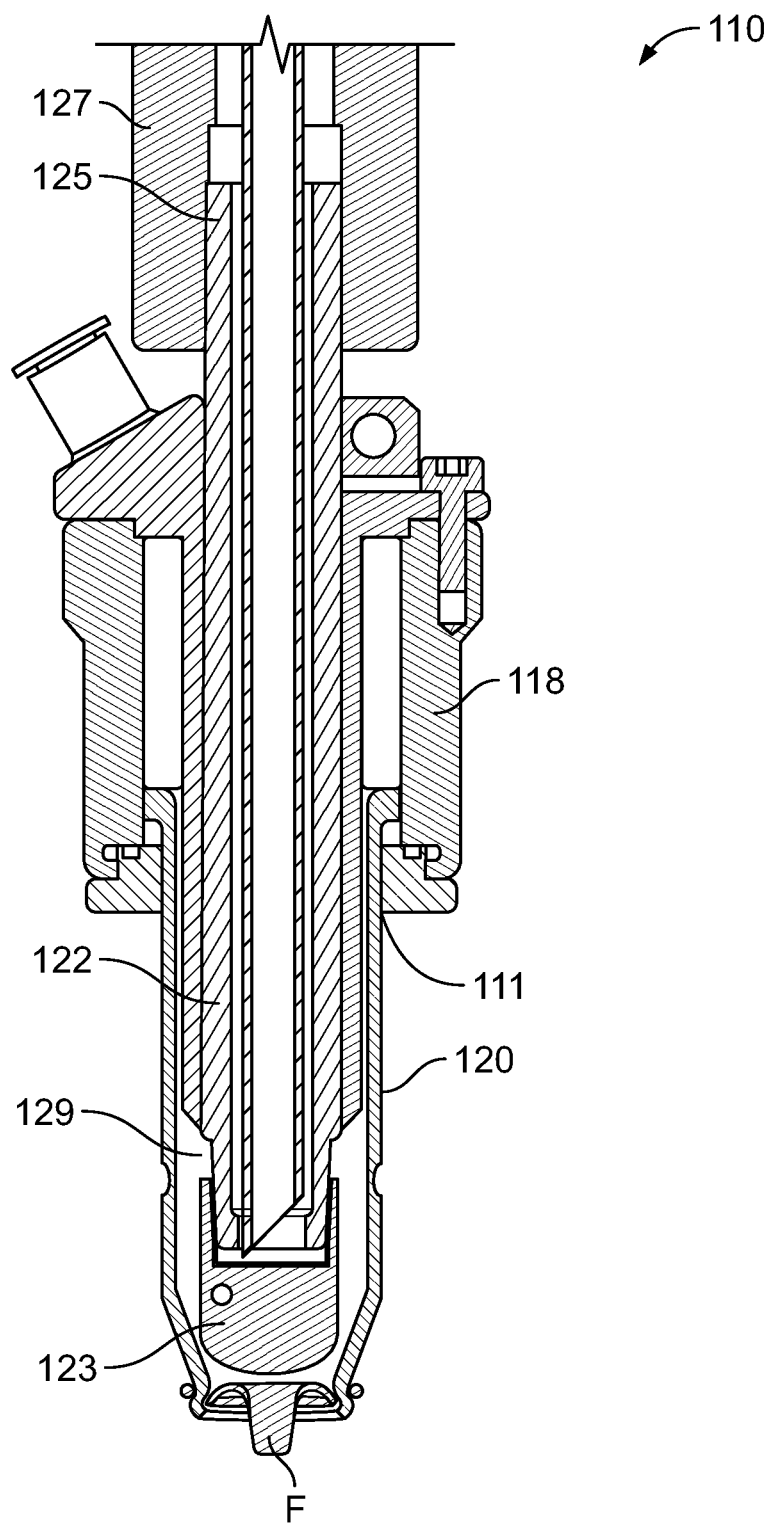
FIG. 13 is a side cross-sectional view of a collet assembly mounted to an electrode of the feeding apparatus shown in FIG. 12.

Referring to FIGS. 12 and 13, in an embodiment, the feeding apparatus 110 includes a resistance welding weld gun 112 having an upper welder portion 114 and a lower welder portion 116 opposite the upper welder portion 114. In an embodiment, the upper welder portion 114 includes an upper electrode holder 122. Referring to FIG. 13, in an embodiment, the upper electrode holder 122 includes a shank 125, one end of which extends from and is mounted removably to an electrode adapter 127, and an opposite end of which is sized and shaped to receive removably an electrode 123. In an embodiment, the electrode 123 has a smooth, radial exterior surface. In an embodiment, the electrode 123 is a cap.

Still referring to FIGS. 12 and 13, in an embodiment, the upper welder portion 114 includes a collet assembly 111 having an actuator 118 and a collet 120 mounted to and extending from the actuator 118. In an embodiment, the actuator 118 is a pneumatic cylinder body. In another embodiment, the actuator 118 is an electric solenoid actuator. In an embodiment, the upper electrode holder 122 is sized, shaped, and adapted to receive movably and slidably the collet 120 (see FIG. 13). In an embodiment, the collet 120 surrounds the upper electrode holder 122 and is movable axially relative to the upper electrode holder 122. In an embodiment, the collet 120 is a split collet. In an embodiment, the collet 120 is adapted to engage a fastener F, such as a rivet, which will be described in further detail below.

Referring to FIGS. 14 through 18, in an embodiment, the actuator 118 includes a tubular-shaped housing 136 having an upper end 138, a lower end 140 opposite the upper end 138, a central passage 142 extending from the upper end 138 to the lower end 140, and a flanged portion 144 located proximate to the upper end 138. In an embodiment, the flanged portion 144 includes a cylindrical-shaped chamber 146 extending transversely therein and is sized and shaped to receive a collet return sensor 230, to be described in further detail below. In an embodiment, the flanged portion 144 of the housing 136 includes a plurality of bores located proximate to the periphery thereof (not shown in the Figures), whose purpose shall be described hereinafter. In an embodiment, a return passage 150 extends through a sidewall 152 of the housing 136 from the upper end 138 proximate to the lower end 140 thereof, and includes a bend 154 that communicates with the central passage 142 of the housing 136 proximate to the lower end 140 thereof (see FIG. 15).

In an embodiment, the actuator 118 includes a sleeve member 156 having a circular-shaped cap 158 and a centrally located, tubular-shaped inner sleeve 160 extending from a lower surface the cap 158. In an embodiment, the inner sleeve 160 includes an inner passage 162 that is sized and shaped to receive the upper electrode holder 122. In an embodiment, a free end 163 of the inner sleeve 160 includes an annular, beveled surface 165. An upper surface 164 of the cap 158 includes a clamp member 166 having gripping portions 168a, 168b that form a centrally located, circular-shaped aperture 170, which aligns and is in communication with the inner passage 162 and is sized and shaped to receive the upper electrode holder 122 therethrough. The gripping portion 168a includes a bore 172a extending transversely therethrough, while the gripping portion 168b includes a bore 172b extending partially therein, the bores 172a, 172b being sized and shaped to receive a fastener 174, such as a clamp screw, for clamping removably the collet assembly 111 to the upper electrode holder 122. The upper surface 164 of the cap 166 further includes a base 176 that extends outwardly and obliquely therefrom. The base 176 includes first and second bores 178, 180 formed therein. In an embodiment, the bores 178, 180 are positioned adjacent to one another. In an embodiment, each of the first and second bores 178, 180 include internal threads. In an embodiment, the first bore 178 is adapted to receive removably an advance port 182, and the second bore 180 is adapted to receive removably a return port 184 (see, for example, FIG. 14). In an embodiment, the cap 166 includes a plurality of apertures 186 and a slot 188, whose purposes and functions shall be described hereinafter.

In an embodiment, the sleeve member 156 is made of a polymer material. In another embodiment, the sleeve member 156 is made of a composite material. In another embodiment, the sleeve member 156 is made of metal. In another embodiment, the sleeve member 156 is made of a non-magnetic material. In another embodiment, the sleeve member 156 is coated with a material adapted to repel spatter during the welding process.

In an embodiment, the sleeve member 156 and the housing 136 are assembled with one another, such that the inner sleeve 160 of the sleeve member 156 is positioned within the central passage 142 of the housing 136 and the cap 158 of the sleeve member 156 is engaged with the upper end 138 of the housing 136. The cap 158 of the sleeve member 156 is fastened removably to the upper end 138 of the housing 136 by a plurality of fasteners 190 extending with the corresponding aligned apertures 186 of the cap 158 and the bores of the flanged portion 144 of the housing 136. In an embodiment, the first bore 178 and in turn the advance port 182 is in communication with the central passage 142 of the housing, while the second bore 180 and in turn the return port 184 is in communications with the return passage 150 of the housing 142.

Referring to FIGS. 14 through 16, 19 and 20, in an embodiment, the collet 120 includes a first end 201 and second end 203 opposite the first end 201, a base 200 at the first end 201, an elongated shank portion 202 extending from the base 200, and a plurality of collet fingers 204 extending from the shank portion 202, each of which includes a tapered, gripping portion 206 proximate to the second end 203. In an embodiment, the collet fingers 204 form a conical shape. In another embodiment, the collet fingers 204 form a flattened side or sides to enable the collet 120 to be positioned proximate to a flange, wall, or other tight area on such flattened side or sides of the collet fingers 204 and, in turn, the fasteners F to be installed in such area on a work piece. In an embodiment, the collet 120 includes six (6) of the collet fingers 204. In another embodiment, the collet 120 includes two (2) of the collet fingers 204. In another embodiment, the collet 120 includes three (3) of the collet fingers 204. In another embodiment, the collet 120 includes four (4) of the collet fingers 204. In another embodiment, the collet 120 includes five (5) of the collet fingers 204. In another embodiment, the collet 120 includes more than six (6) of the collet fingers 204. In an embodiment, the collet fingers 204 are spaced equally from one another. In another embodiment, at least one gap is formed between two of the collet fingers 204 to enable the collet 120 to be positioned proximate to a flange, wall, or other tight area on such gapped side of the collet fingers 204 and, in turn, the fasteners F to be installed in such area on a work piece. In an embodiment, the base 200 includes an outside diameter that is greater than an outside diameter of the shank portion 202.

In an embodiment, a sensor ring 211 is installed on the shank portion 202 and below and juxtaposed with the base 200 of the collet 120. In an embodiment, the sensor ring 211 is made of metal. In embodiment, the sensor ring 211 is a ferrous ring. In an embodiment, an internal passage 205 extends from the first end 201 to the second end 203 of the collet 120.

In an embodiment, each of the gripping portions 206 of the collet fingers 204 of the collet 120 includes an internal bump 208. In an embodiment, each of the internal bumps 208 is rounded in shape. In an embodiment, each of the gripping portions 206 includes a first internal gripping segment 210 that extends obliquely and outwardly relative to a longitudinal axis A-A of the collet 120, and a second internal gripping segment 212 that extends obliquely and inwardly relative to the longitudinal axis A-A of the collet 120, forming the free, second end 203 of the collet 120. In an embodiment, the gripping segments 212 are tapered at ends thereof to facilitate the entry of the fastener F into the collet 120. In an embodiment, the segments 210, 212 of gripping portions 206 of the collet 120 matches and accommodates the geometry of the fastener F, such as the head of a rivet. In an embodiment, the tapered ends of the gripping segments 212 coincide with a rounded head of the rivet so that the collet fingers 204 expand outwardly as the rivet is driven into the opening thereof. In an embodiment, an elongated slot 214 is formed axially between a corresponding adjacent pair of the collet fingers 204. In an embodiment, the fingers 204 form an external groove 216 that is sized and shaped to receive a ring 218. In an embodiment, the ring 218 is an O-ring. In another embodiment, the ring 218 is a metal spring. In an embodiment, the ring 218 provides inward, radial force against the collet fingers 204 to maintain them in a closed position when required during the welding cycle.

In an embodiment, the collet 210 is made of a polymer material. In another embodiment, the collet 210 is made of a composite material. In another embodiment, the collet 210 is made of metal. In an embodiment, the collet 210 is made of spring steel. In another embodiment, the collet 210 is made of a non-magnetic material. In an embodiment, the collet 210 is made of stainless steel. In another embodiment, the collet 210 is made of made of aluminum bronze. In another embodiment, the collet 210 is made of a ceramic material. In another embodiment, the collet 210 is coated with a protective material. In an embodiment, the protective coating material prevents welding spatter, from a welding process by either the weld gun 112 or a neighboring weld gun, from sticking to the collet 120.

In an embodiment, the collet 120 is assembled with the actuator 118 such that the base 200 and a portion of the shank portion 202 of the collet 120 is positioned within the central passage 142 of the actuator 118, and the inner sleeve 160 is positioned within the internal passage 205 of the collet 120. An end cap 220 is installed removably on the housing 136 at the lower end 140 thereof, thereby securing the collet 120 to the actuator 118. In an embodiment, the end cap 220 is attached to the housing 136 by a cam lock mechanism. In another embodiment, the end cap 220 is attached threadedly to the housing 136. In another embodiment, the end cap 220 includes knurling, flats, notches, pins or other means to facilitate the installation and removal of the cap 220, either manually, by a hand tool, or automatic actuation.

Figure 14:
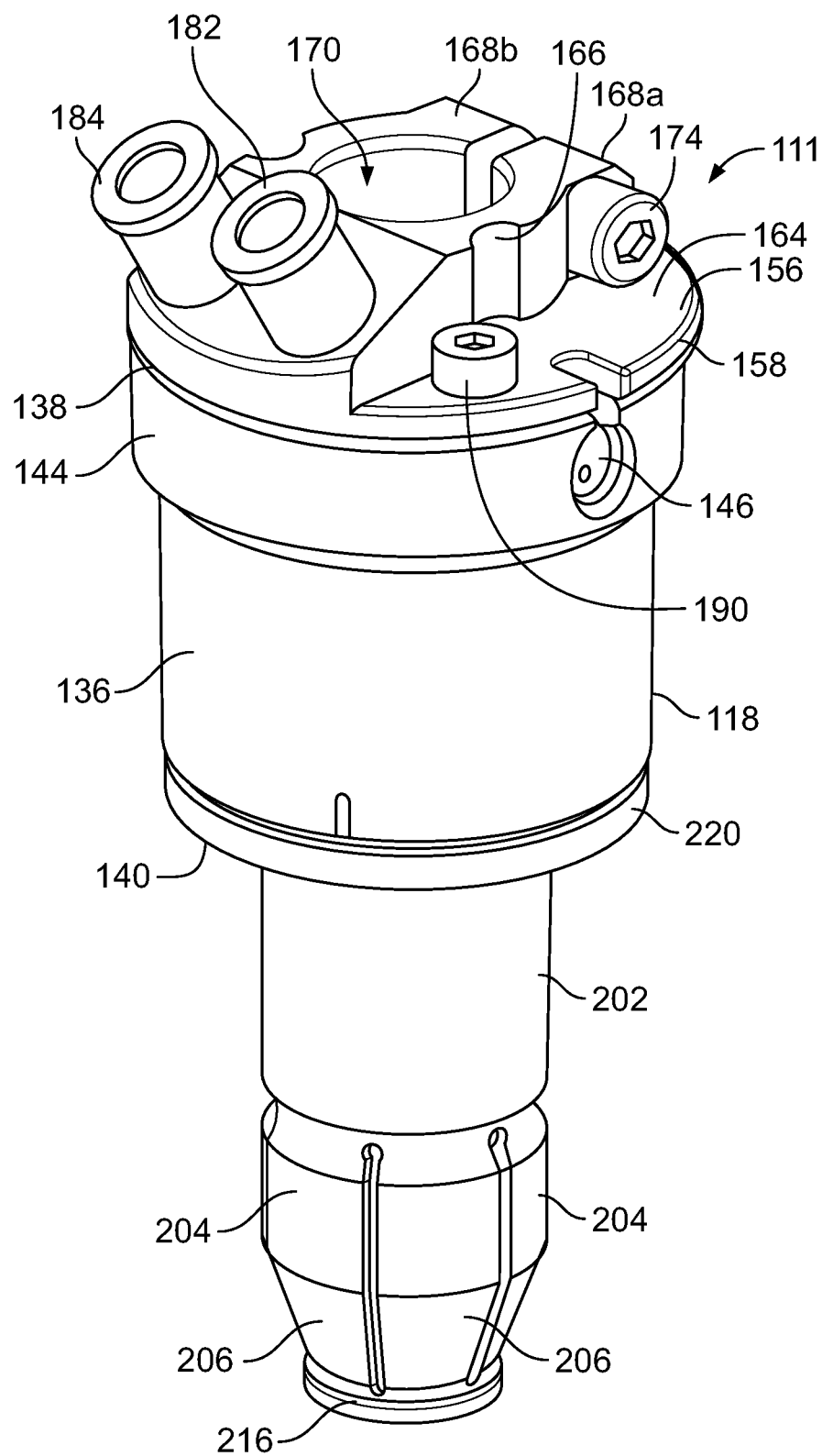
FIG. 14 is a top perspective view of the collet assembly shown in FIG. 13.
Figure 15:
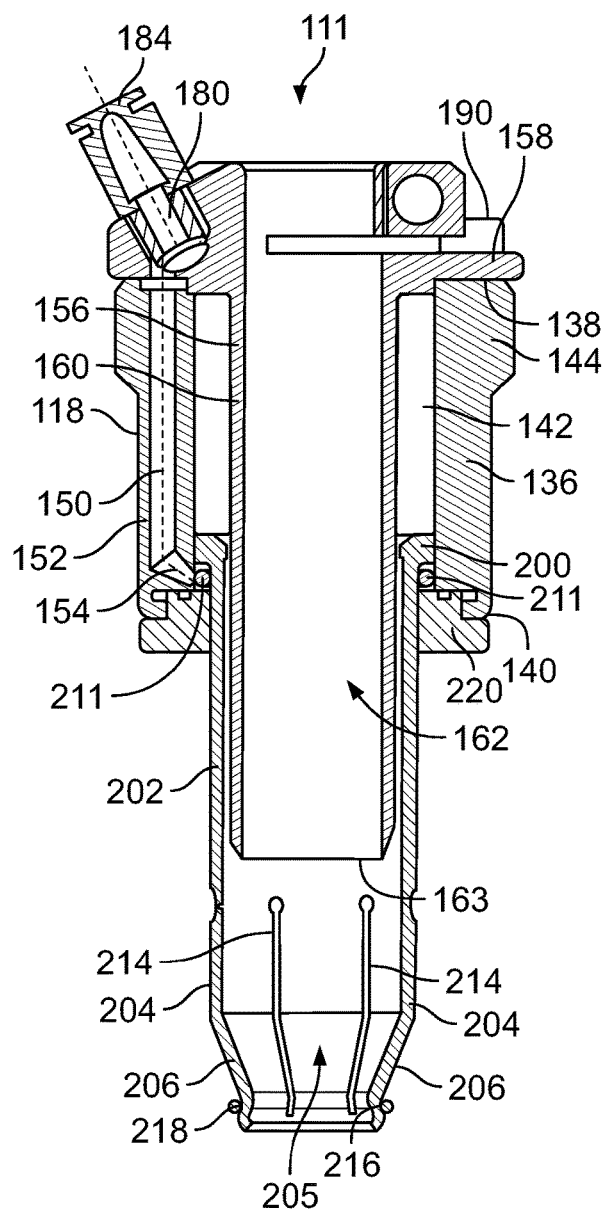
FIGS. 15 and 16 are side cross-sectional views of the collet assembly shown in FIG. 14.
Figure 16:
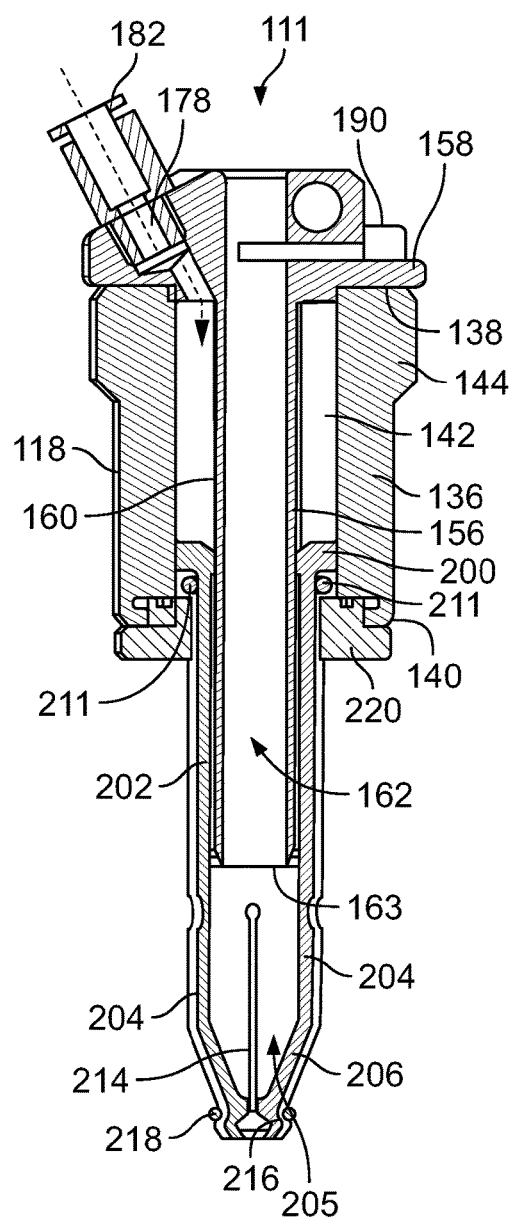
Figure 18:
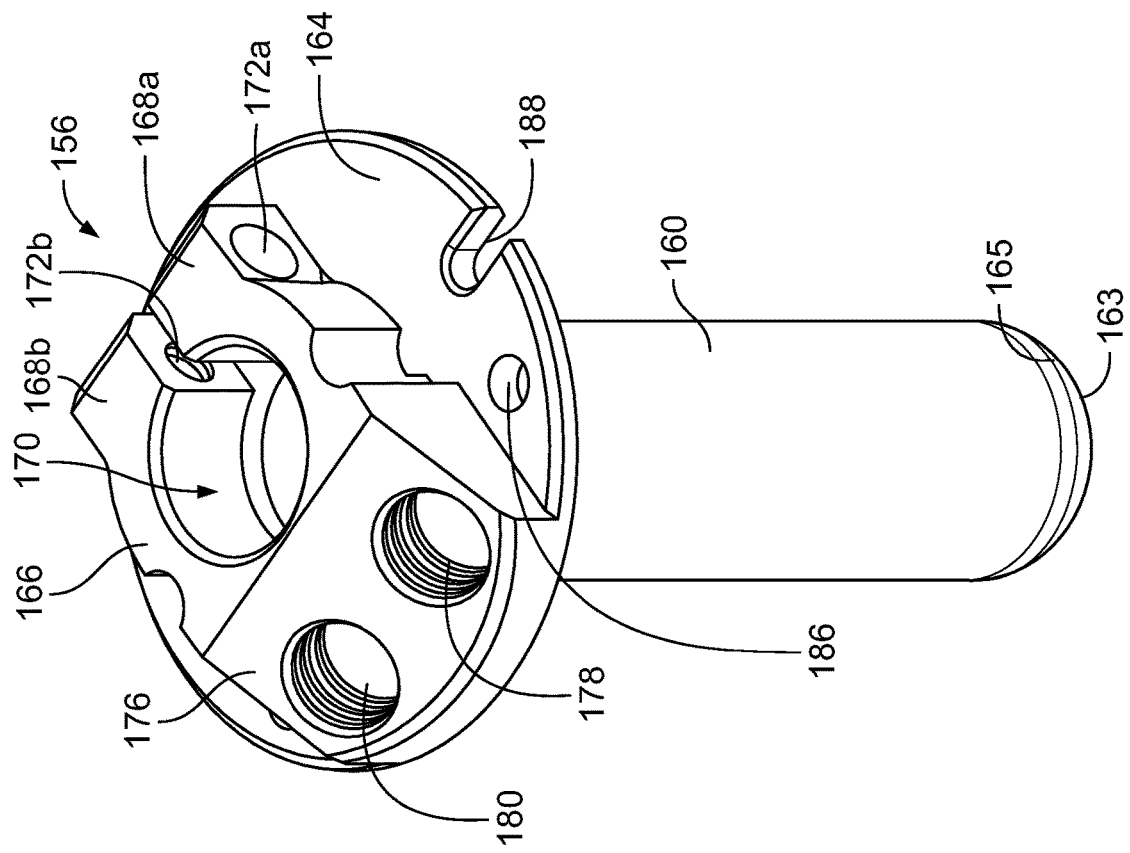
FIG. 18 is a close-up perspective view of a portion of the sleeve shown in FIG. 17.
Figure 17:
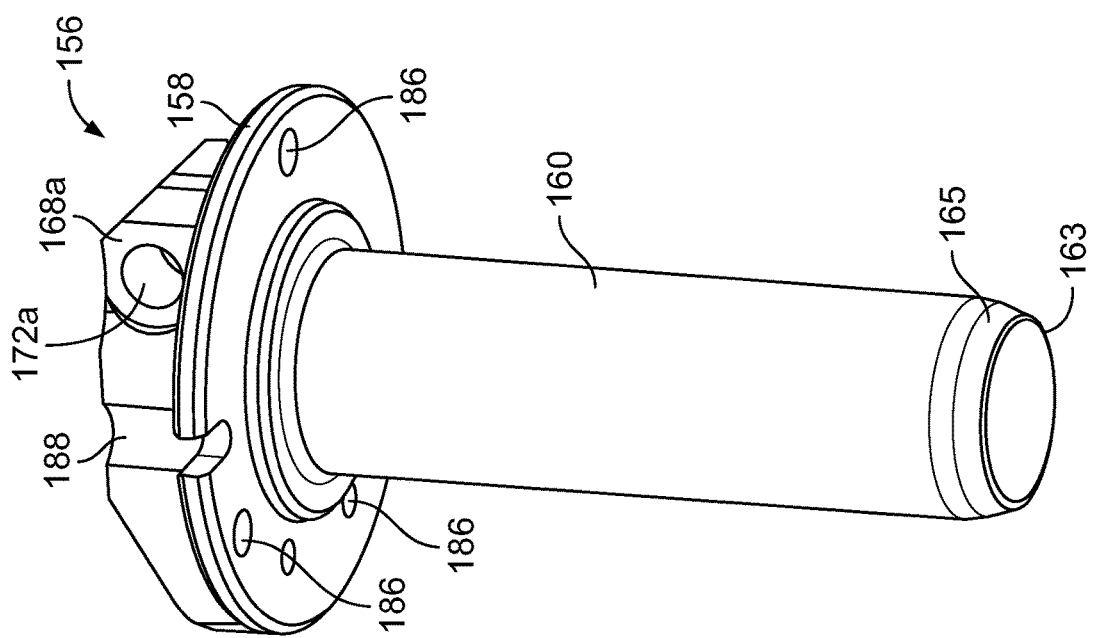
FIG. 17 is a bottom perspective view of a sleeve employed by the collet assembly shown in FIG. 14.
Figure 20:
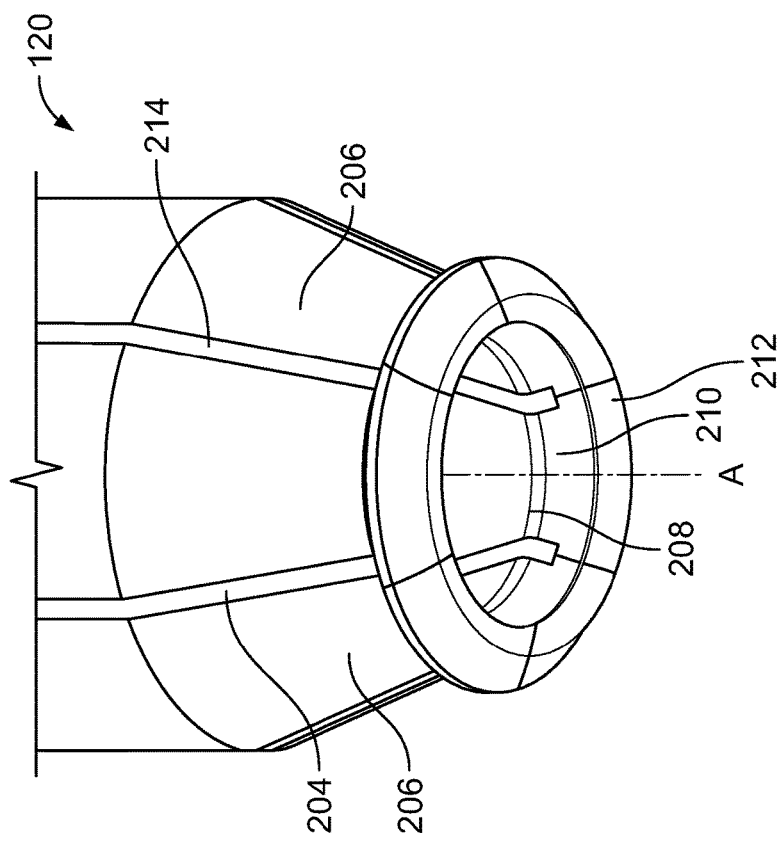
FIGS. 19 and 20 are bottom and top perspective views, respectively, of a collet employed by the collet assembly shown in FIG. 14.
Figure 19:
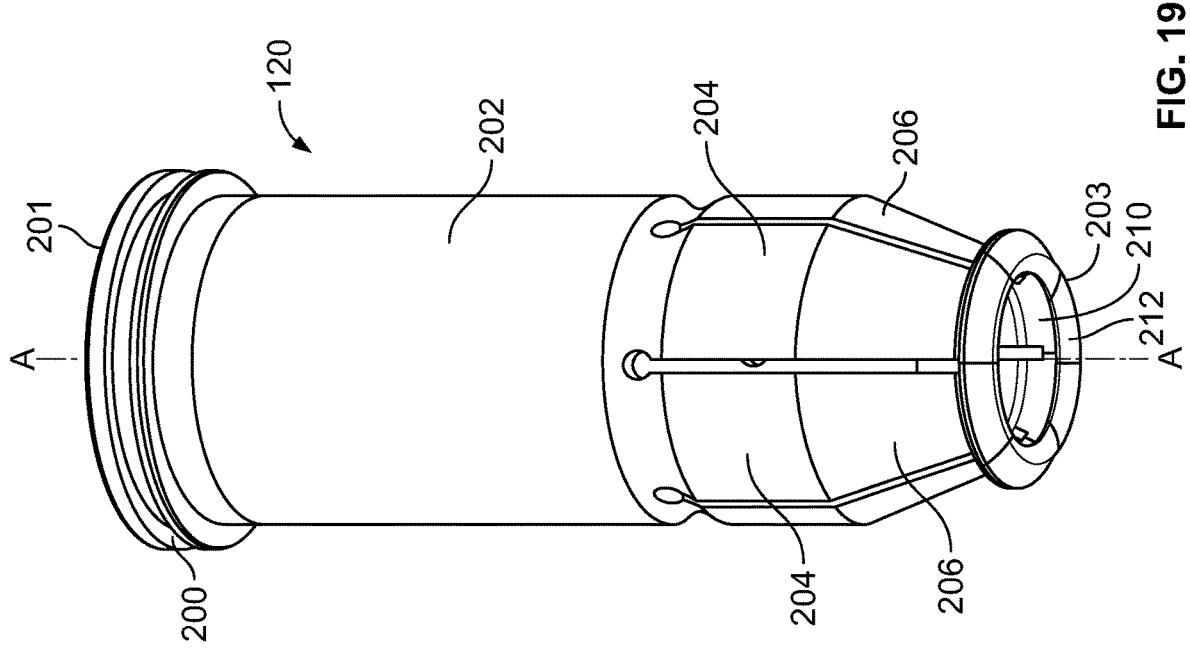
Figure 21:
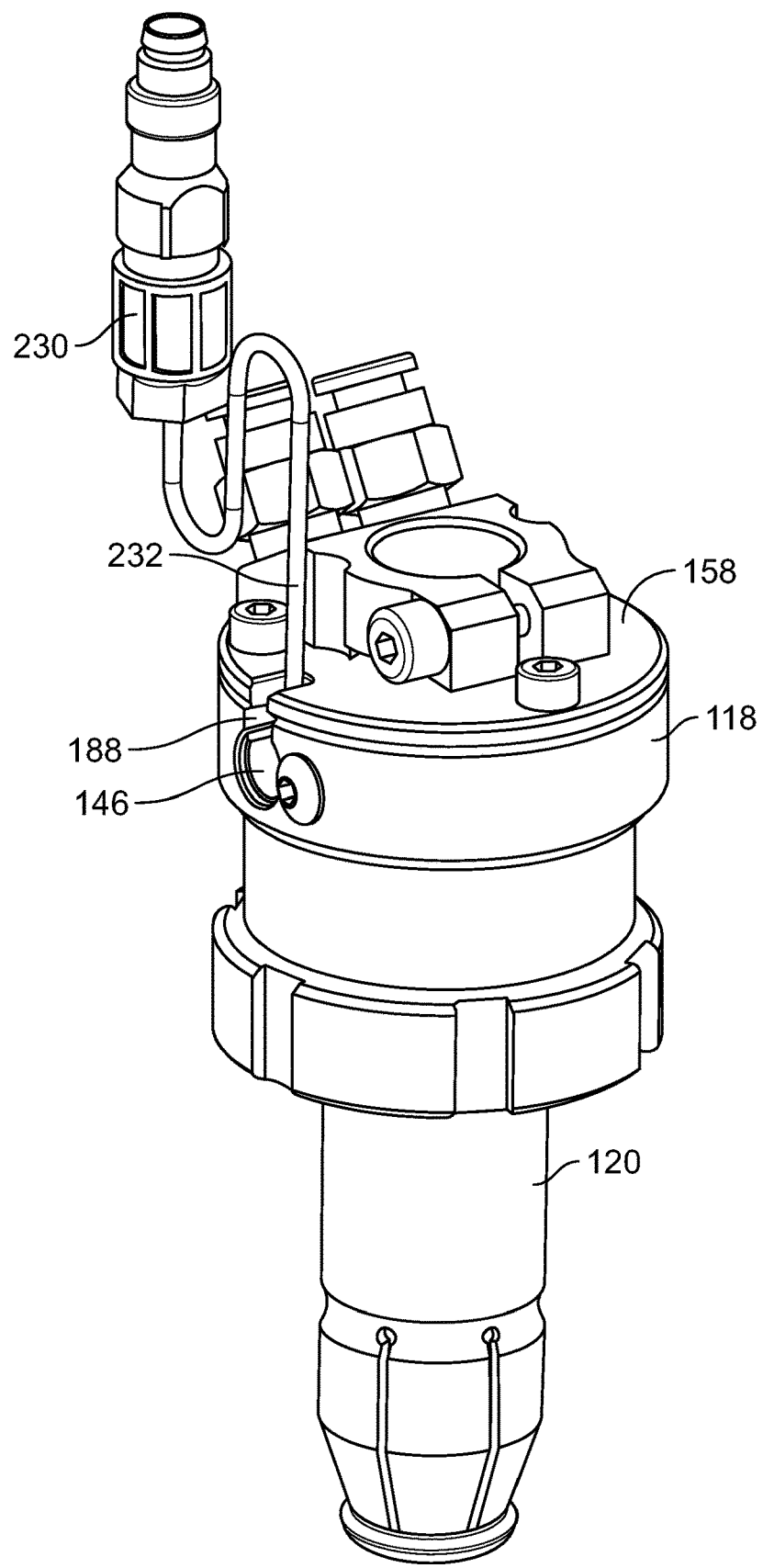
FIG. 21 is a top perspective view of the collet assembly shown in FIG. 14 but including a sensor.
Figure 22:
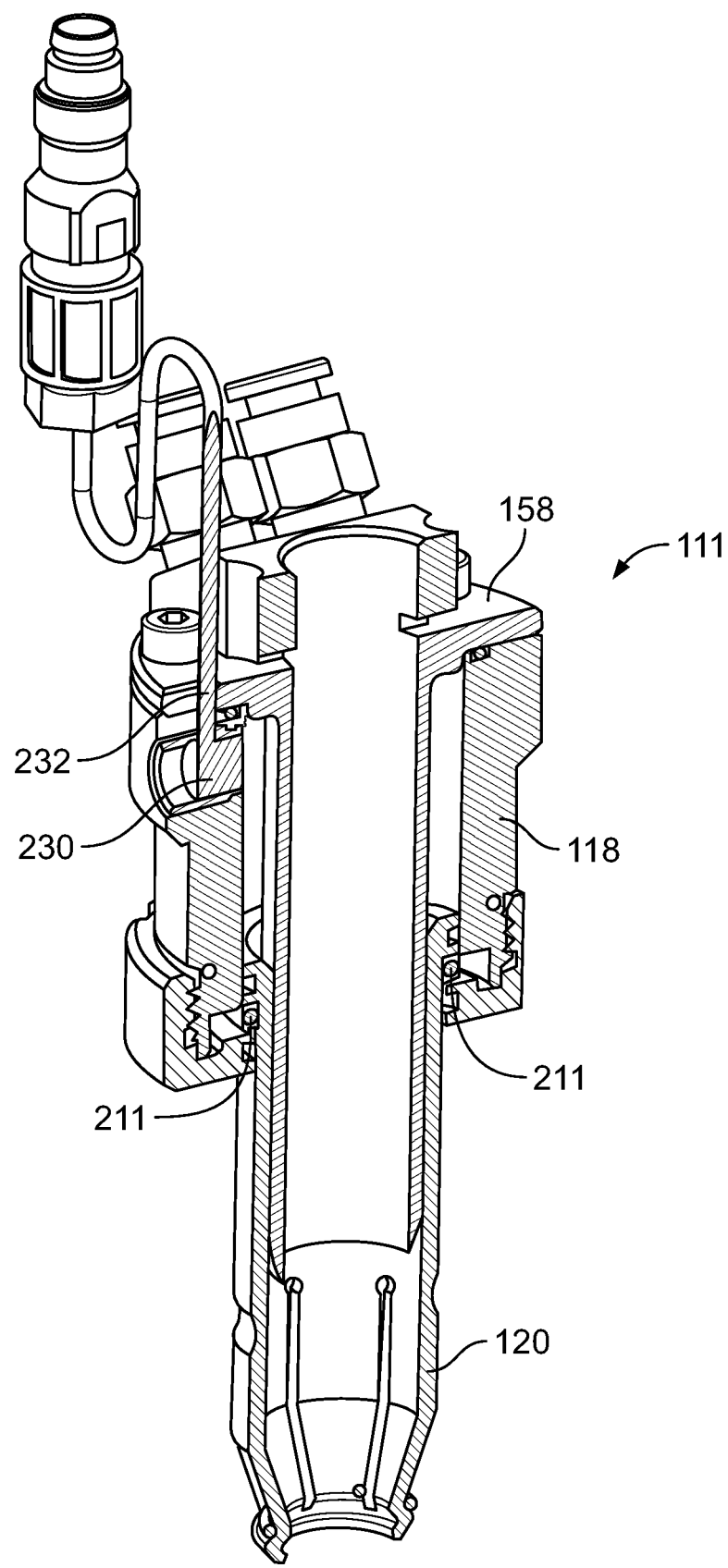
FIGS. 22 and 23 are sectional views of the collet assembly shown in FIG. 21, with the collet assembly in an advanced position.
Figure 23:
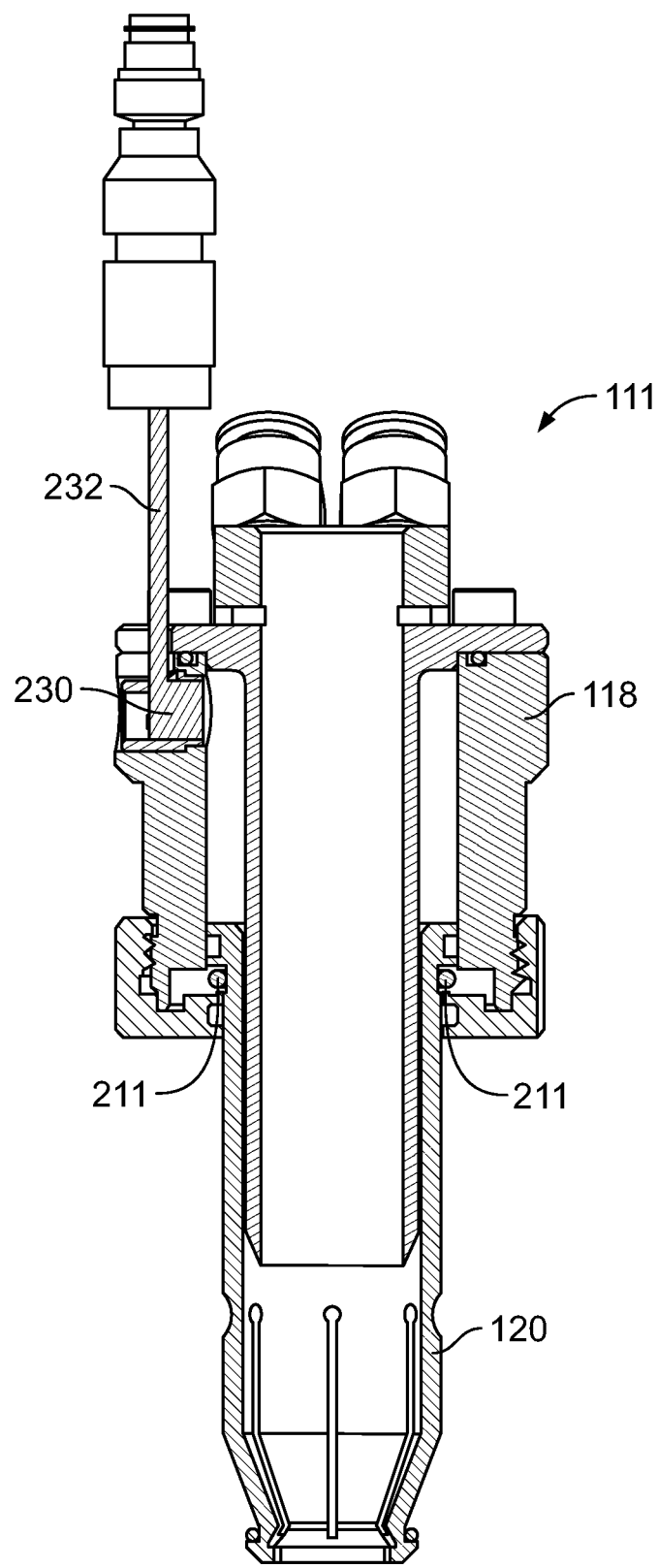
Figure 24:
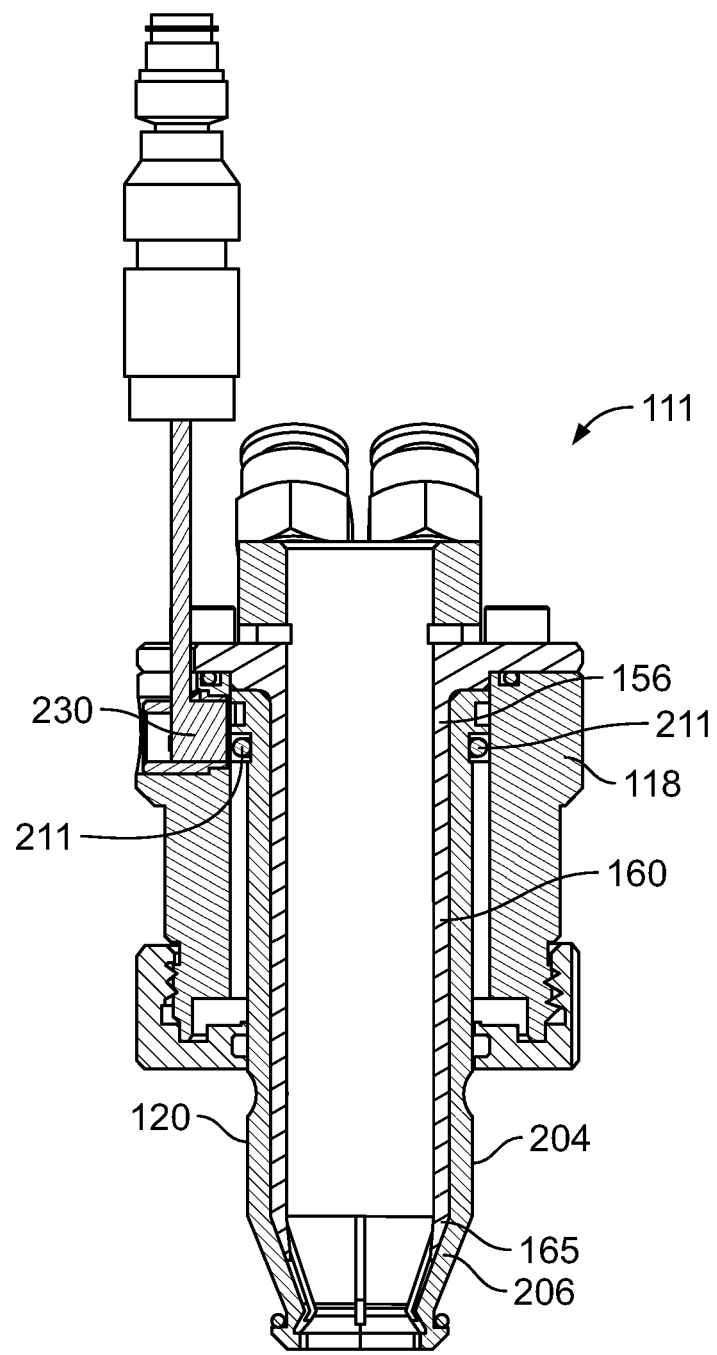
FIG. 24 is a close-up view of a portion of the collet assembly shown in FIG. 23, but with the collet assembly in retracted position.

Referring to FIGS. 21 through 24, in an embodiment, the chamber 146 of the actuator 118 (which is also shown in FIG. 14) is adapted to receive the sensor 230. An electrical wire 232 of the sensor 230 is enabled to pass through the slot 188 of the cap 158. In an embodiment, the sensor 230 senses when the sensor ring 211 of the collet 120 is not aligned with the sensor 230 when the collet 120 is in an advanced position, as shown in FIG. 23, and when the sensor ring 211 is aligned with the sensor 230 when the collet 120 is in a fully retracted position, as shown in FIG. 24. In an embodiment, the sensor 230 and the chamber 146 are positioned such that it is not exposed to air pressure and, therefore, no corresponding leakage of air pressure occurs therein. In another embodiment, the sensor ring 211 is positioned on the collet 120 such that not wiped by any seals of the collet assembly 211, thereby inhibiting wear thereon.

Figure 26:
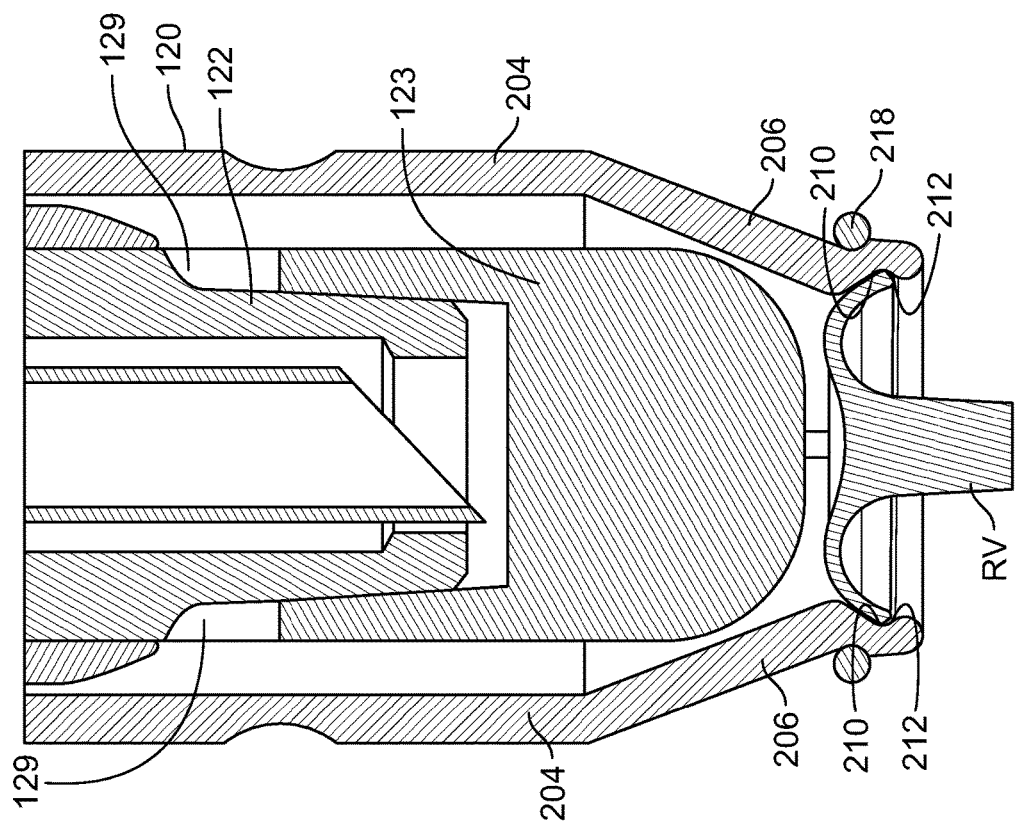
FIGS. 25 and 26 are sectional views of a portion of the collet assembly shown in FIG. 13, and further showing steps of the collet assembly engaging and gripping a rivet.
Figure 25:
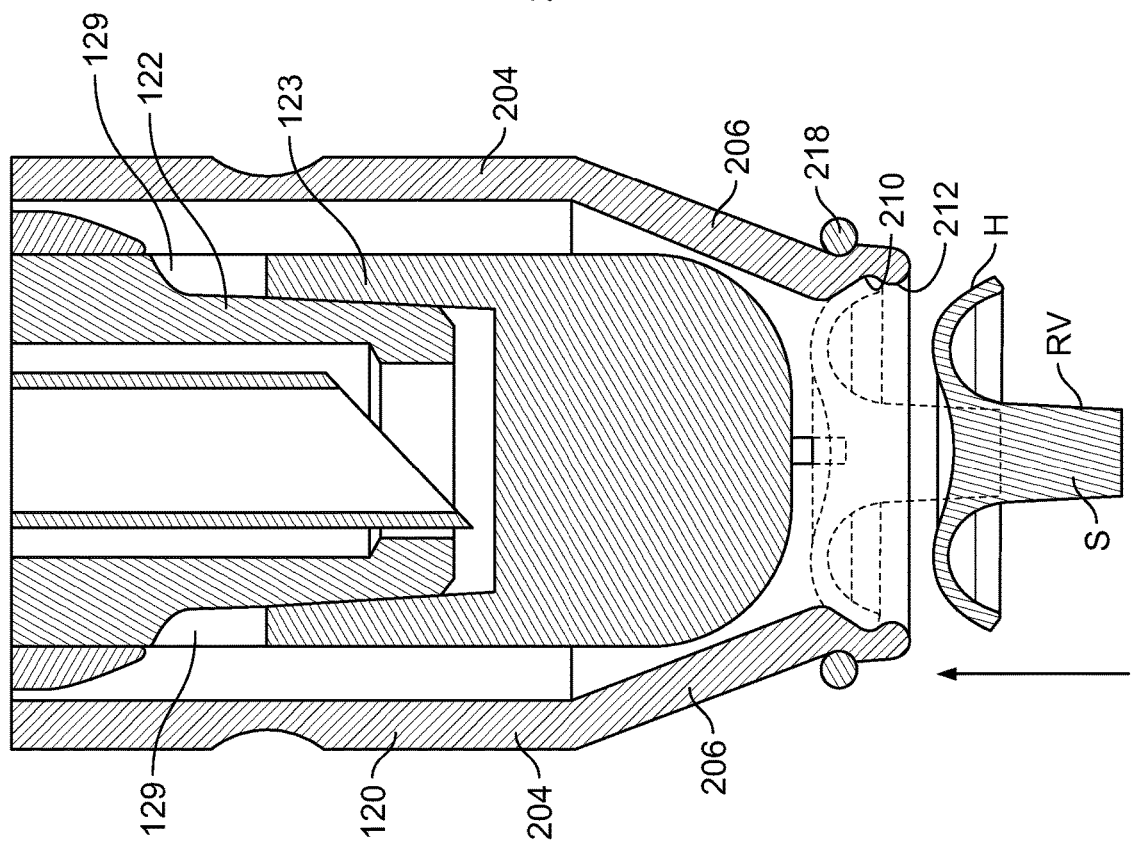

Referring to FIG. 25, the collet 120 is in a fully advanced position using pneumatic air pressure in the advance port 182 of the actuator 118 and a rivet RV is presented to the feed apparatus 110 from an upstream transfer system positioned below the collet 120 (not shown in FIG. 25). In an embodiment, the rivet RV includes a rivet head H and a stem S. The rivet RV is aligned axially therein with the collet 120 and pressed axially by the transfer system into the gripping portions 206 of the collet fingers 204 thereof. The collet fingers 204 are deflected outwardly as the rivet head H is pressed into the collet 120. As shown in FIG. 26, the rivet head H snaps into the collet 120, is aligned coaxially, and is secured against the first and second internal gripping segments 210, 212 of the gripping portions 206 of the collet fingers 204. As indicated above, in an embodiment, the tapered ends of the gripping segments 212 coincide with a rounded rivet head H of the rivet RV so that the collet fingers 204 expand outwardly as the rivet RV is driven into the opening thereof. The ring 218 provides additional radial force against the collet fingers 204 to assist in maintaining the collet's 120 grip on the rivet RV. In an embodiment, the collet 120 is adapted to grip rivet heads having various diameters. In an embodiment, the collet 120 is adapted to grip the rivets RV when the stem S is facing upwardly, such as, for example, a rivet having a threaded stem. In this regard, the electrode 123 is sized and shaped to conform to the geometry of a rivet RV having a threaded stem S (for instance, to provide a donut-shaped weld). In an embodiment, after the rivet RV is loaded into the collet 120, the rivet transfer system indexes away from the collet 120. In an embodiment, the rivet transfer system indexing may occur simultaneously as the robotic movements between weld joints, in order to keep the rivet loading process time buried within robot move time to have minimal or no impact on the joint-to-joint cycle time. In an embodiment, the rivets RV are not only held against gravity, but against all forces that are associated with robotic motions and inertia of the welder.

Figure 27:
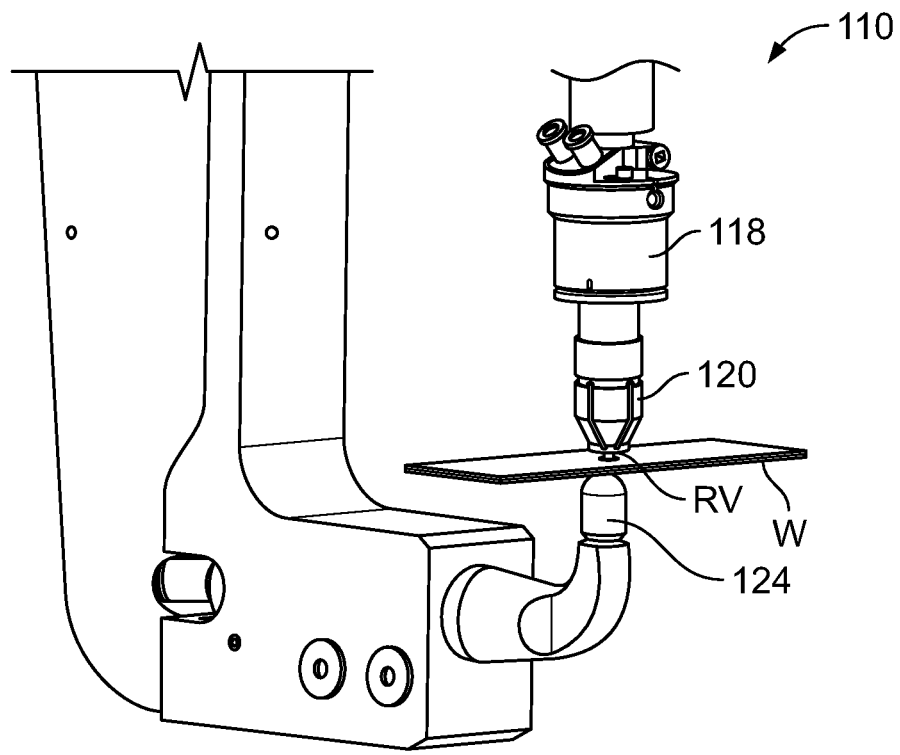
FIGS. 27 and 28 are perspective views of a portion of the feed apparatus shown in FIG. 12, and further showing steps of the feed apparatus welding a rivet to a workpiece, the collet being shown in an advanced position and a retracted position, respectively.

Referring to FIG. 27, the feed apparatus 110 advances the rivet RV to a joint location on a work piece W, and the rivet H is ready for welding thereto by the upper electrode holder 122 and a lower electrode 124. Once again, in an embodiment, this motion can be in time parallel with movements of the robot weld gun. At this position, both the advance port 182 and the return port 184 of the actuator 118 are placed into an exhaust state where the advance pneumatic air is released, thereby enabling the collet 120 to "float" or move unrestricted within the actuator 118 and relative to the inner sleeve 160. This also enables the upper electrode holder 122 to clamp against the rivet RV. In an embodiment, the collet 120 does not include dynamic seals in order to minimize friction drag during actuation and preventing the rivet RV from popping out through the back of the collet fingers 204. In another embodiment, the collet 120 includes low breakaway friction seals.

Figure 28:
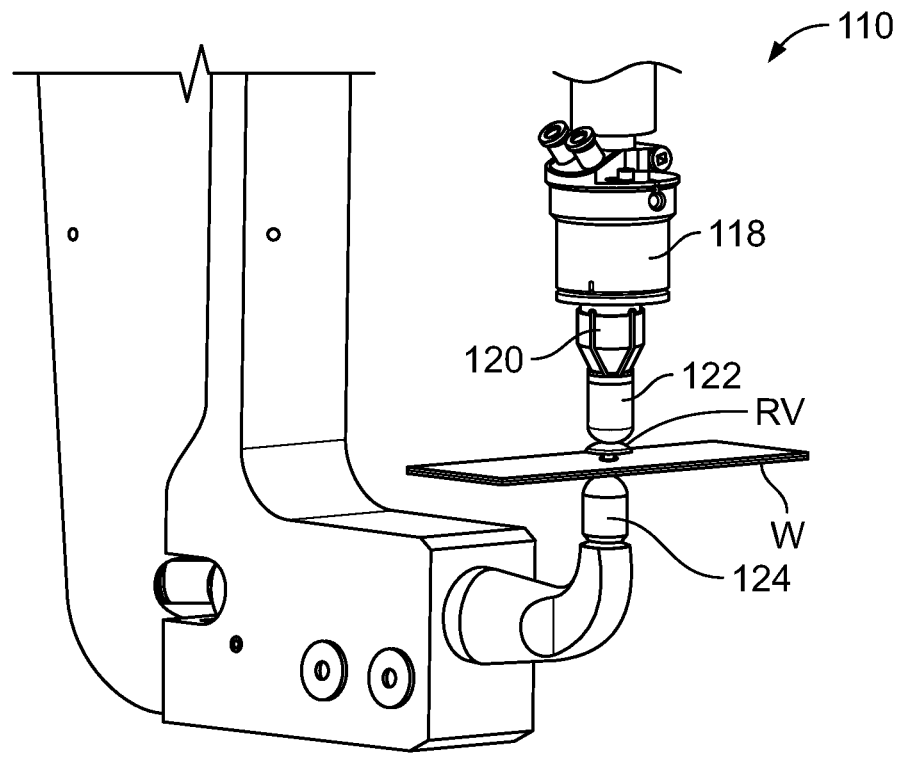

Referring to FIG. 28, when the rivet RV contacts the work piece W, the force on the rivet pushes to collet 120 which slides axially into the housing 136 until the rivet RV is pinched between the electrode 123 and the work piece W. In an embodiment, the structure and features of the collet 120 as described herein enable it to automatically compensate for reduced height of the electrode 123 after electrode tip dressing. At this point, the rivet R is held by the against the work piece W, and the collet 120 is retracted by pneumatic pressure on the return port 184 in order to retract the collet 120 from the rivet R and away from the work piece W and expose the electrode 123. The retracting action of the collet 120 strips the collet fingers 204 from the outer edge of the head H of the rivet R. In this regard, the interior surfaces of the gripping portions 206 of the collet fingers 204 rides along the radial, exterior surface of the electrode 123 and subsequently along the beveled surface 165 of the inner sleeve 160 of the sleeve member 156 (see FIG. 24). It is noted that, in some embodiments, the upper electrode holder 122 may include a lock taper portion for connecting the electrode 123 (see FIGS. 25 and 26) thus creating an annular gap or notch 129 between the electrode shank 125 and the electrode 123. When the collet fingers 204 ride along the beveled surface 165 of the inner sleeve 160, the inner sleeve 160 prevents the collet fingers 204 from engaging and jamming within the notch 129. Moreover, the inner sleeve 160 fills a portion of the gap between the exterior surface of the electrode shank 125 and the interior surface of the collet 120, thereby enabling for smoother movement of the collet 120 when it is retracted. When the collet 120 is fully retracted, it is positioned within a safe region, such that the collet 120 is positioned at a sufficient distance from the welding process of the rivet R to the work piece W, such that sparks, debris, expulsion, fumes and heat will not damage the collet 120. In this regard, the sensor ring 211 is aligned with the sensor 230 when the collet 120 is in its fully retracted position. Having an indication that the collet 120 is in its fully retracted position is important during the welding process and during maintenance of the electrodes, such as electrode 123 replacement and dressing, in order to prevent damage to the collet 120 or electrode cap maintenance equipment.

Welding of the rivet RV is performed and when the weld schedule sequence is complete, the weld gun actuator retracts to return the upper electrode holder 122 to the open position, and the collet 120 is advanced forward by applying pneumatic air to the advance port 182 of the actuator 118 in preparation of the next rivet transfer cycle.

In an embodiment, the feeding apparatus 110 may be used on existing resistance spot welding guns fitted onto robotic automation, along with a system of integrated auxiliary components for the handling, sorting and orientation, feeding, and presentation of the rivet RV to the resistance welding gun. In an embodiment, the feeding apparatus 110 may also be applied to pedestal (i.e., stationary) resistance welding equipment in which the parts are robotically or manually fed into a station. In an embodiment, the collet 120 is adapted to be fed rivets R automatically. In another embodiment, the collet 120 is adapted to be fed rivets R manually. In an embodiment, the collet 120 may be cleared and retracted manually or by automatic control in the event a misfeed of a rivet R occurs. In an embodiment, the collet 120 may be sized and shaped to accommodate electrode diameters ranging from 12 mm to over 25 mm. In an embodiment, the collet 120 may be sized and shaped to accommodate rivet diameters in a range from 10 mm to over 25 mm. In an embodiment, mechanically gripping of the rivet RV by the collet 120 is agnostic of rivet material. In another embodiment, the feed apparatus 110 may be used to retract the collet 120 and expose the electrode holder 122 to perform a conventional resistance spot weld without a rivet RV.

In an embodiment, the rivet RV is loaded into the collet 120 via an upstream transfer system. In other embodiments, the rivet RV may be loaded into the collet 120 while the feed apparatus 110 is in any orientation. In other embodiments, the rivet RV may be loaded into the collet 120 while the feed apparatus 110 is moving at a rate of acceleration.

It is further noted that during electrode dressing operations, the upper and lower electrodes 123, 124 may lose a length of material, such as, for example, 2 mm to 6 mm worth of material such as copper. As a result, there will be an increasing gap distance from the electrode face to the rivet feed location of the collet 120. The collet 120 may be equalized to the electrode face during the welding gun close step to provide contact with the electrode, maintain axial alignment, and a low resistance interface for maximizing weld quality while minimizing electrode erosion. Accordingly, the collet 120 position is independent of the electrode 123 length and the fact that the electrode 123 is not part of the rivet positioning or holding, the rivet RV is securely held in place regardless of the state of the electrode cap maintenance cycle. This is because the distance between the end of the dressed electrode 123 and contact to the rivet RV increases through the dressing cycle, but the weld gun actuator takes up this additional travel distance.

In an embodiment, the collet 120 may be retracted into the actuator 118 during electrode 123 maintenance intervals. This may be performed by applying pneumatic air into the return port 184. This state is the same states as described above during the rivet welding operation. When the collet 120 is retracted, the electrode 123 is exposed and sufficient clearance is provided so that the electrode 123 can be placed into a cap dressing machine. Also in this state, the electrode 123 be presented to a welding cap extractor/replacement machine. The foregoing is possible by way of the collet fingers' 204 compliance with a relatively larger diameter of the upper electrode holder 122 to allow the fingers 204 to stretch over it. In another embodiment, the feeding apparatus 110 is adapted to provide a burst of compressed air down and out through the collet 120 for the purpose of blowing away any soot or deflect any flying spatter away from the slots 214 of the collet 120, in order to keep in interior of the collet 120 clean and reduce any buildup of foreign particles and, in turn, reduce maintenance issues. In an embodiment, the collet 120 may be removed and replaced by removing the end cap 220 from the housing 136. The collet 120 may be removed and replaced with light axial force.

Figure 29:
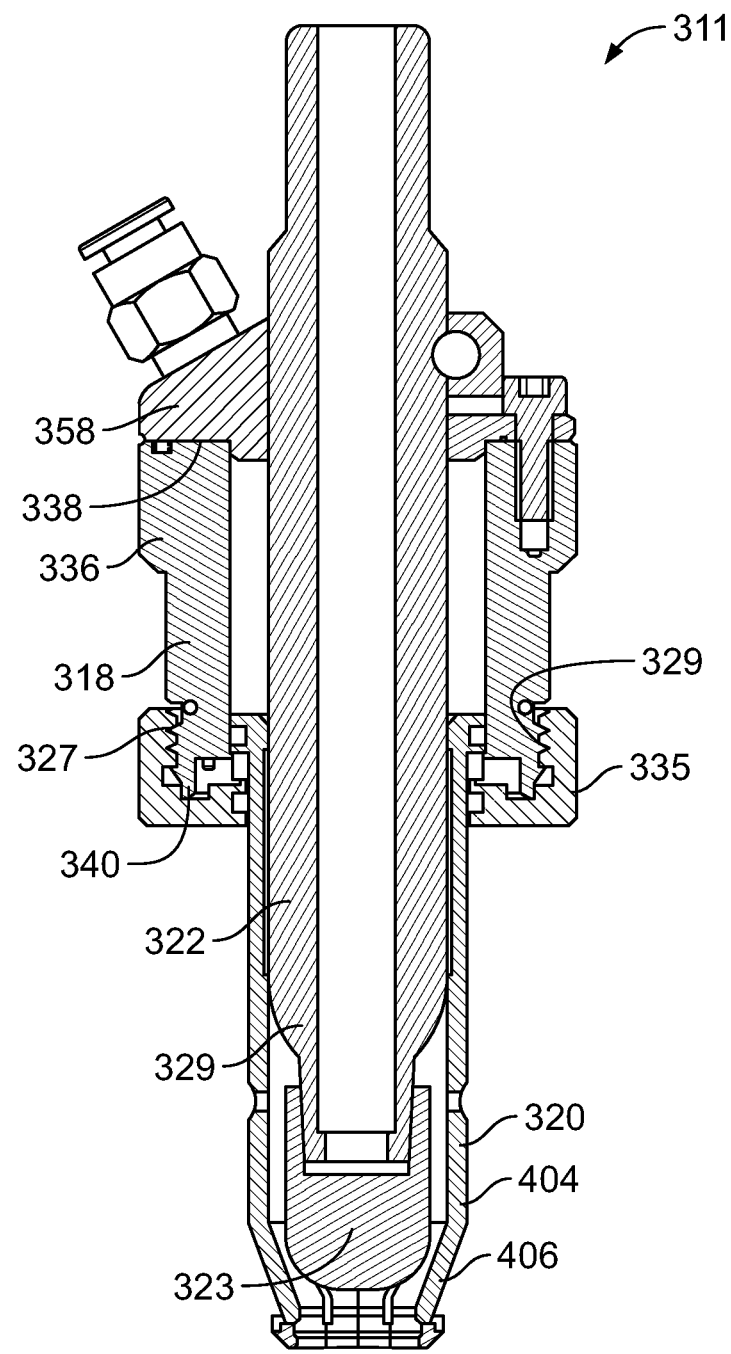
FIG. 29 is a side cross-sectional view of another embodiment of a collet assembly mounted to an electrode.

FIG. 29 show another embodiment of a collet assembly 311 including an actuator 318 and a collet 320. The collet assembly 311 is structured and functions in a manner similar to those of the collet assembly 111, except that there is no sleeve member having an elongated sleeve. In an embodiment, the actuator 318 includes a housing 336 having an upper end 338, a lower end 340, an upper cap 358 secured removably to the upper end 338, and an end cap 335 secured removably to the lower end 340. In an embodiment, the end cap 335 has internal threads 327 and the housing 336 has external threads 329 proximate to the lower end 340 which mate threadedly the internal threads 327 of the end cap 335. In an embodiment, an upper electrode 322 includes a shank 325 having a rounded end portion 329. In an embodiment, the interior surfaces of gripping portions 406 of collet fingers 404 rides along the radial, exterior surface of the electrode cap 323 and subsequently along the rounded end portion 329 of the upper electrode 322 when the collet is retracted.

It should be understood that the embodiments described herein are merely exemplary and that a person skilled in the art may make many variations and modifications without departing from the spirit and scope of the invention. All such variations and modifications are intended to be included within the scope of the claims.

What is claimed is:

1. In combination, a welding gun having an electrode holder, an electrode attached to the electrode holder, and an electrode cap attached to the electrode holder, and a collet assembly, comprising an actuator, and a collet connected to the actuator, the collet assembly being installed on the electrode holder, the collet being moveable by the actuator from an advanced position, in which the collet is adapted to grip a fastener, and a retracted position, in which at least a portion of the collet is retracted into the actuator to enable the electrode to weld the fastener to an external work piece, and in which the collet is adapted to release the fastener, wherein the electrode is shrouded by the collet when the collet is in its advanced position, and the electrode is exposed from the collet when the collet is in its retracted position.

2. The combination of claim 1, wherein the collet includes an elongated shank portion and a plurality of collet fingers extending from the shank portion, the plurality of collet fingers being sized and shaped to grip the fastener when the collet is in its advanced position.

3. The combination of claim 2, wherein each of the plurality of collet fingers includes a gripping portion.

4. The combination of claim 3, wherein each of the gripping portions includes a tapered member that is tapered inwardly relative to a longitudinal axis of the collet.

5. The combination of claim 4, wherein each of the gripping portions includes a first gripping segment that extends from the tapered member outwardly relative to the longitudinal axis of the collet, and a second gripping segment that extends from the first gripping segment inwardly relative to the longitudinal axis of the collet.

6. The combination of claim 2, wherein the collet includes a ring positioned around the plurality of collet fingers.

7. The combination of claim 5, wherein the actuator includes a housing having an upper end, a lower end opposite the upper end, and a central passage extending from the upper end to the lower end, and wherein the collet is positioned slidably within the central passage of the housing of the actuator.

8. The combination of claim 7, wherein the actuator includes a sleeve member having an inner sleeve positioned within the central passage of the housing of the actuator, and wherein the collet includes an internal passage, and wherein the inner sleeve of the sleeve member of the actuator is positioned within the internal passage of the collet.

9. The combination of claim 8, wherein the sleeve member includes a cap attached to the upper end of the housing.

10. The combination of claim 9, wherein the cap is attached removably to the upper end of the housing.

11. The combination of claim 9, wherein the sleeve member is integral with the housing.

12. The combination of claim 9, wherein the cap includes an advance port in communication with the central passage of the housing for providing pneumatic air pressure for advancing the collet to its advanced position.

13. The combination of claim 12, wherein the cap includes a return port in communication with the central passage of the housing for providing pneumatic air pressure for retracting the collet to its retracted position.

14. The combination of claim 13, wherein the collet includes a sensor member, and wherein the actuator includes a sensor located proximate to the upper end of the housing for sensing an alignment of the sensor member of the collet with the sensor when the collet is in its retracted position.

15. The combination of claim 8, wherein the electrode holder is positioned within the inner sleeve of the sleeve member.

16. The combination of claim 15, wherein the electrode holder includes an adapter shaft, the electrode being attached removably to the adapter shaft.

17. The combination of claim 16, wherein the electrode is a welding electrode.

18. The combination of claim 17, wherein the fastener is a rivet.

19. The combination of claim 17, wherein the fastener is a stud.

20. The combination of claim 8, wherein the inner sleeve includes a free end having a beveled surface and positioned within the central passage of the housing proximate to the lower end of the housing, and wherein when the collet is moved from its advanced position to its retracted position, the tapered members of the collet engage the beveled surface of the inner sleeve.

21. The combination of claim 13, wherein the advance port and the return port are further adapted to release the pneumatic air pressure to enable the collet to move freely within the actuator relative to the inner sleeve between the advanced position of the collet and the retracted position of the collet.

* * * * *